United States Patent
Kim et al.

(10) Patent No.: US 10,216,883 B2
(45) Date of Patent: Feb. 26, 2019

(54) INTEGRATED CIRCUIT AND METHOD OF DESIGNING INTEGRATED CIRCUIT

(71) Applicant: SAMSUNG ELECTRONICS CO., LTD., Suwon-si, Gyeonggi-Do (KR)

(72) Inventors: Ha-Young Kim, Seoul (KR); Sung-We Cho, Hwaseong-si (KR); Tae-Joong Song, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 123 days.

(21) Appl. No.: 15/351,545

(22) Filed: Nov. 15, 2016

(65) Prior Publication Data

US 2017/0277819 A1    Sep. 28, 2017

(30) Foreign Application Priority Data

Mar. 22, 2016 (KR) .......................... 10-2016-0033995

(51) Int. Cl.
| | | |
|---|---|---|
| *G06F 17/50* | (2006.01) | |
| *G03F 1/00* | (2012.01) | |
| *G03F 7/00* | (2006.01) | |
| *G03F 7/20* | (2006.01) | |

(52) U.S. Cl.
CPC ...... *G06F 17/5072* (2013.01); *G03F 7/70425* (2013.01); *G06F 17/5068* (2013.01); *G06F 17/5081* (2013.01); *G03F 1/14* (2013.01); *G03F 7/70433* (2013.01); *G06F 2217/12* (2013.01)

(58) Field of Classification Search
None
See application file for complete search history.

(56) References Cited

U.S. PATENT DOCUMENTS

| | | | |
|---|---|---|---|
| 8,255,837 B2 | 8/2012 | Lu et al. | |
| 8,327,301 B2 * | 12/2012 | Cheng | G03F 7/70433 716/110 |
| 8,584,052 B2 | 11/2013 | Chen et al. | |
| 8,726,215 B2 | 5/2014 | Lee et al. | |
| 8,745,556 B2 | 6/2014 | Chen et al. | |
| 8,850,378 B2 | 9/2014 | Buck et al. | |
| 9,026,958 B1 | 5/2015 | Ghosh et al. | |
| 9,141,752 B2 | 9/2015 | Lin et al. | |
| 9,934,347 B2 * | 4/2018 | Seo | G06F 17/5072 |
| 2013/0086536 A1 | 4/2013 | Kim et al. | |
| 2014/0040847 A1 | 2/2014 | Milinichik et al. | |
| 2015/0302129 A1 | 10/2015 | Chen et al. | |

(Continued)

FOREIGN PATENT DOCUMENTS

JP    201164922    8/2011

*Primary Examiner* — Leigh M Garbowski

(74) *Attorney, Agent, or Firm* — Volentine, Whitt & Francos, PLLC

(57) ABSTRACT

A computer-implemented method of designing an integrated circuit (IC) includes allocating a plurality of colors to a plurality of patterns corresponding to one layer of a first cell so that a multi-patterning technology is designated for use in forming the plurality of patterns, the first cell being a multi-height cell corresponding to a plurality of rows, generating a plurality of shift cells, in which a color remapping operation associated with the plurality of patterns is performed for each row, with respect to the first cell, and storing a cell set including the first cell and the plurality of shift cells in a standard cell library.

20 Claims, 23 Drawing Sheets

(56) References Cited

U.S. PATENT DOCUMENTS

2016/0147929 A1\*  5/2016  Hoover ............... G06F 17/5081
                                                716/55
2016/0147933 A1\*  5/2016  Petermann .......... G06F 17/5081
                                                716/52

\* cited by examiner

FIG. 7B

|  | MHC | MHCa | MHCb | MHCc |
|---|---|---|---|---|
| CASE1 | A_SHIFT_00 | A_SHIFT_10 | A_SHIFT_01 | A_SHIFT_11 |
| CASE2 | A_SHIFT_a | A_SHIFT_b | A_SHIFT_c | A_SHIFT_d |
| CASE3 | A_SHIFT_1 | A_SHIFT_2 | A_SHIFT_3 | A_SHIFT_4 |

INTEGRATED CIRCUIT AND METHOD OF DESIGNING INTEGRATED CIRCUIT

PRIORITY STATEMENT

This application claims the benefit of Korean Patent Application No. 10-2016-0033995, filed on Mar. 22, 2016, in the Korean Intellectual Property Office, the disclosure of which is incorporated herein in its entirety by reference.

BACKGROUND

The inventive concept relates to integrated circuits (IC), and more particularly, to a method of designing ICs, and to a method of manufacturing a semiconductor device comprising an IC.

The designing of integrated circuits involves an operation of converting a behavior model of a chip, which describes an operation to be performed by a semiconductor integrated circuit constituted by the chip, into a specific structure model that represents connections among electronic components of the circuit. In a process of designing the semiconductor integrated circuit, a library of cells representing certain parts of a semiconductor integrated circuit is created and the semiconductor integrated circuit is designed using the created library and then manufactured in conformance with the design. In this way, it is possible to minimize the time and cost needed to design and realize the semiconductor integrated circuit.

SUMMARY

According to an aspect of the inventive concept, there is provided a computer-implemented method of designing an IC, including allocating a plurality of colors to a plurality of patterns of a first cell, generating a plurality of shift cells for the first cell, and storing a cell set including the first cell and the plurality of shift cells in a standard cell library. The first cell is a multi-height cell in which the patterns of the multi-height cell occupy a plurality of rows, and the patterns of the multi-height cell correspond to IC patterns that are to be formed in one layer of the IC by a multi-patterning technology (MPT). The shift cells comprise a first shift cell including a remapped form of the patterns of the multi-height cell that occupy one of the plurality of rows along with the colors allocated thereto, and a second shift cell including a remapped form of the patterns of the multi-height cell that occupy another of the plurality of rows along with the colors allocated thereto.

According to another aspect of the inventive concept, there is provided a computer-implemented method of designing an integrated circuit, including placing a multi-height cell and a single height cell in a cell layout, determining whether a color violation exists between the multi-height cell and the single height cell, and performing a color remapping operation of the cell layout when the color violation occurs. Here, the cells include patterns that are to be formed in a common layer in the IC. The patterns of the multi-height cell occupy first and second rows in the cell layout and the patterns of the single height cell occupy the first row in the cell layout, and the patterns have different colors allocated to them. The different colors are indicators of processes that are to be used to form corresponding patterns of the IC, respectively. When the color violation occurs, the color remapping operation of the cell layout revises the patterns of the multi-height cell or the patterns of the single height cell. The revising of the patterns in the color remapping operation includes accessing a standard cell library in which is stored a shift cell associated with the single height cell and different shift cells each associated with the multi-height cell. The different shift cells associated with the multi-height cell include a revised form of the patterns of the multi-height cell that occupy the first row in the cell layout and a revised form of the patterns of the multi-height cell that occupy the second row in the cell layout.

According to another aspect of the inventive concept, there is provided a method of manufacturing a semiconductor device comprising a computer aided design process of designing an integrated circuit (IC), and a manufacturing process comprising fabricating the integrated circuit (IC). The computer aided design process includes generating a layout of the IC and executing a color remapping operation on the layout. The layout is generated by executing a layout operation of laying out cells in a plurality of parallel rows within a footprint. The cells include maps, respectively, of patterns to be formed at the same level as one another in the IC by a multi-patterning process using a plurality of masks, and each of the patterns have allocated thereto a color as a designator of which mask among the plurality of masks is to be used to form the pattern in the multi-patterning process. In the layout operation the cells are selected from a library containing a set of standard cells including at least one single height cell each including a map of patterns confined to one of the rows in the footprint when the single height cell is selected and laid out in the footprint, and at least one multi-height cell each including a map of rows of patterns occupying adjacent rows, respectively, in the footprint when the multi-height cell is selected and laid out in the footprint. The color remapping operation is executed by accessing a program of instructions. The instructions of the color remapping operation include instructions to examine, along each of adjacent first and second ones of adjacent rows in the footprint, colors of patterns of standard cells selected from the library and laid out in the footprint in the layout operation so as to occupy the first and second ones of adjacent rows in the footprint. The instructions of the color remapping operation also include instructions to remap the first row of patterns, along with the colors allocated thereto, of a multi-height cell selected from the library and laid out in the footprint in a case in which a second cell selected from the library is laid out in the footprint in said first one of the adjacent rows, the multi-height cell is laid out in the footprint adjacent to the second cell in the first direction, and a color violation exists between the second cell and the multi-height cell laid out adjacent thereto in the first direction. And the instructions of the color remapping operation also include instructions to remap the second row of patterns, along with the colors allocated thereto, of a multi-height cell selected from the library and laid out in the footprint in a case in which a second cell selected from the library is laid out in the footprint in said second one of the adjacent rows, the multi-height cell is laid out in the footprint adjacent to the second cell in the first direction, and a color violation exists between the second cell and the multi-height cell laid out adjacent thereto in the first direction. The manufacturing process includes executing the multi-patterning process using masks having mask patterns based on the colors allocated to the patterns in the layout after the remapping operation has been executed.

BRIEF DESCRIPTION OF THE DRAWINGS

The inventive concept will be more clearly understood from the following detailed description of examples thereof taken in conjunction with the accompanying drawings in which:

FIG. 7B is a table illustrating various naming rules for a cell;

DETAILED DESCRIPTION

An IC may be represented by a plurality of cells and may be designed by using a cell library of cells each having associated characteristic information. More specifically, the cell library may include the following information associated with cells: names, measurements, gate widths, pins, delay characteristics, leakage currents, threshold voltages, and functions. A normal cell library may include basic cells, such as an AND cell, an OR cell, a NOR cell, and an INVERTER cell, complex cells, such as an OAI (OR/AND/INVERTER) cell and an AOI (AND/OR/INVERTER) cell, and storage elements, such as a master-slave flip-flop and a latch.

In examples of the inventive concept described below, a cell library of the type described above may be referred to as a standard cell library. A standard cell methodology refers to a method of designing a dedicated large-scale integration (LSI) circuit customized to the specification of a client or user by preparing logic circuit blocks (or cells) of various functions in advance and combining the cells based on the specification of the client or user. After being designed and verified in advance, the cells are registered in a computer. Logic design, placement, and routing for combining the cells are made using computer aided design (CAD).

In more detail, if at least a certain number of standardized logic circuit blocks (or cells) are retained in a library ahead of designing/manufacturing the LSI circuit, the whole circuit may be designed by selecting logic circuit blocks, which are appropriate for a current design, from among the retained logic circuit blocks, laying out the selected logic circuit blocks on a region corresponding to that of a chip in a plurality of cell rows, and designing routing defining the interconnections of components represented by the cells such that the length of an interconnection between cells is as short as possible. As the cells retained in the library become more diverse, there is more freedom in the design process. This also increases the probability of designing a chip optimally.

Figure 1:
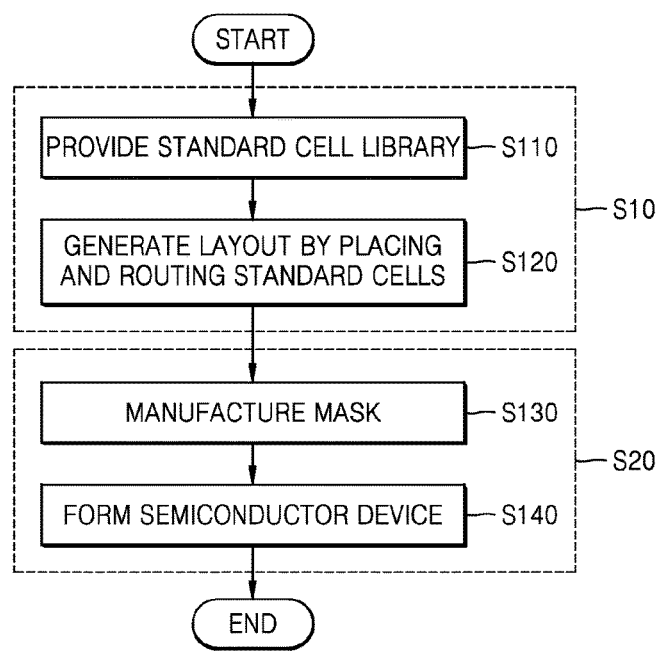
FIG. 1 is a flowchart of a method of manufacturing a semiconductor device, according to an example of the inventive concept.

FIG. 1 is a flowchart of an example of a method of manufacturing a semiconductor device, according to the inventive concept.

Referring to FIG. 1, the semiconductor device manufacturing method may be divided into an integrated circuit designing process S10 and an integrated circuit manufacturing process S20. The integrated circuit designing process S10, which is an operation of designing a layout of an integrated circuit, may include operations S110 and S120 and may be performed by a tool for designing the integrated circuit. In this case, the tool for designing the integrated circuit may be a program that includes a plurality of instructions executed by a processor. As such, the integrated circuit designing process S10 may be referred to as a computer-implemented method for designing of integrated circuits. Meanwhile, the integrated circuit manufacturing process S20 may be an operation of manufacturing a semiconductor device corresponding to the integrated circuit based on the designed layout and may be performed by a semiconductor process module.

In operation S110, a standard cell library is provided. Here, the standard cell library may include a plurality of standard cells and may be stored in a non-transitory computer-readable storage medium. The standard cell library may include layout and timing information of standard cells. In an example, an operation of providing the standard cell library may include an operation of creating the standard cell library and more specifically, an operation of designing standard cells.

A semiconductor device formed of components represented by the standard cells may include a structure in which layers are stacked, and each of the layers has a plurality of patterns. Conventionally, the patterns of a layer are formed by a patterning process that uses a mask to selectively expose certain regions of the layer, and an etch process to etch the exposed regions. However, there is a need for reducing a space between adjacent patterns to improve the degree of integration of the integrated circuit. As such, the plurality of patterns of a layer may be formed by a patterning technique using a plurality of masks as to realize an effective resolution under which patterns having the desired degree of integration can be formed in a single layer.

The patterning technology that uses a plurality of masks is generally referred to as "multi-patterning technology" (MPT). More specifically, multi-patterning technology that is utilized to form a plurality of patterns by using two masks is referred to as a "double patterning technology" (DPT), multi-patterning technology that is utilized to form a plurality of patterns by using three masks is referred to as a "triple patterning technology" (TPT), and multi-patterning technology that is utilized to form a plurality of patterns by using four masks is referred to as a "quadruple patterning technology" (QPT).

In an example of the inventive concept, the operation of designing the standard cells may include a color decomposition operation in which a plurality of patterns are designed using a plurality of colors corresponding to a plurality of masks, respectively. Here, the color decomposition operation may be referred to as a "coloring operation", and data representing correspondence between, i.e., correlating, a plurality of patterns and a plurality of masks that are to be used to form the patterns may be referred to as "coloring information". More specifically, a plurality of colors may be allocated to a plurality of patterns corresponding to one layer of a standard cell through the color decomposition operation. As such, patterns of the same color may be formed by using the same mask, and patterns of different colors may be formed by using different masks.

In an example of the inventive concept, the standard cell library may store a standard cell and at least one shift cell corresponding to the standard cell. Here, the shift cell refers to a cell in which color remapping (or a color remapping operation) is performed with respect to a plurality of colors, which are allocated to a plurality of patterns corresponding to one layer of the standard cell, for each row. Here, the color remapping operation, which is an operation of swapping first and second different colors allocated to patterns in advance, may be referred to as a "color swapping operation" or "color inverting operation". The color swapping operation will be described in more detail with reference to FIGS. 4 and 6.

In operation S120, a layout is designed by placing and routing standard cells by using the standard cell library, that is, through placement and routing (P&R). In more detail, first, input data that defines an integrated circuit is received. Here, the input data may be data that is generated by synthesis by using the standard cell library from an abstract form of a behavior of an integrated circuit, for example, data defined in a register transfer level (RTL). For example, the input data may be a bitstream or netlist that is generated by synthesizing an integrated circuit defined by a VHSIC hardware description language (VHDL) and a hardware description language (HDL) such as Verilog.

Next, a storage medium that stores the standard cell library is accessed, and standard cells, which are selected according to the input data from among a plurality of standard cells stored in the standard cell library, are placed and routed. Here, the placement and routing refers to an operation of laying out the selected standard cells and electrical connections of the standard cells. When the placement and routing is completed, a layout of the integrated circuit is created.

According to the above description, the integrated circuit designing process S10 may include operations S110 and S120. However, examples are not limited thereto. For example, the integrated circuit designing process S10 may further include the following various operations according to general integrated circuit designing methods: revision of a standard cell library, verification of a layout, and post simulation.

In operation S130, a mask is manufactured based on the layout. In more detail, first, optical proximity correction (OPC) is performed on the basis of the layout. OPC is a process of changing the layout based on an error due to an optical proximity effect. Then, a mask may be manufactured according a result of performing the OPC. In this case, the mask may be manufactured by, for example, a graphic design system (GDS) to which the OPC is applied. In this operation, a number of masks may be manufactured corresponding to the number of colors allocated to patterns of the layout.

In operation S140, the semiconductor device is formed by using the manufactured masks. The semiconductor device is formed by performing various semiconductor processes on a semiconductor substrate (e.g., a wafer) by using the masks. For example, the masks may be used when performing a patterning process by using a lithography process. A target pattern may be formed on the semiconductor substrate or a material layer by the patterning process. The semiconductor processes may include a deposition process, an etching process, an ion process, a cleaning process, etc. Here, the deposition process may any of various processes for forming a material layer, such as a chemical vapor deposition (CVD) process, a sputtering process, and a spin coating process. The ion process may include an ion implantation process, a diffusion process, an annealing process, etc. Furthermore, the semiconductor processes may include a packaging process in which a semiconductor device is mounted on a printed circuit board (PCB) and is encapsulated within a molding member and a test process in which the semiconductor device or the package is tested.

Figure 2A:
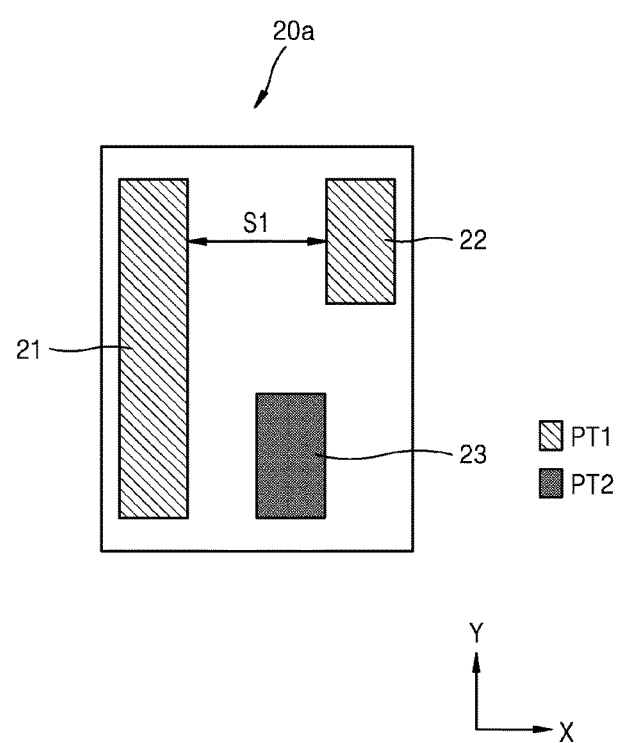
FIGS. 2A and 2B are layouts of patterns of integrated circuits (ICs)
Figure 2B:
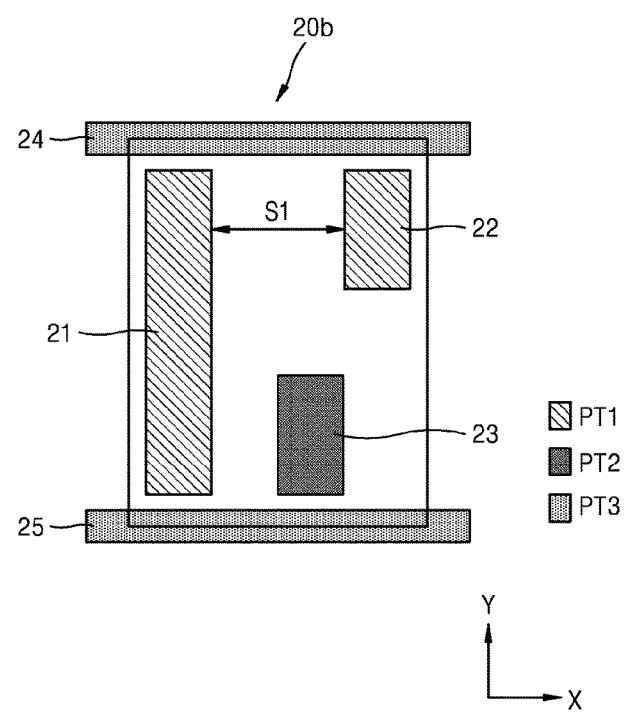

FIGS. 2A and 2B are representations of layouts of integrated circuits, designed according to an example of the inventive concept.

Referring to FIG. 2A, an integrated circuit 20a may be formed by using the DPT. Accordingly, the integrated circuit 20a may be formed based on two masks. More specifically, the integrated circuit 20a may include first patterns 21 and 22, to which a first color is allocated, and a second pattern 23 to which a second color is allocated. The first and second patterns 21 to 23 are patterns of the same layer. In this case, the first color may be different from the second color. Accordingly, the first patterns 21 and 22 and the second pattern 23 may be formed using two different masks, respectively.

More specifically, the first patterns 21 and 22 assigned the first color may be transcribed (formed by patterning process) using a first mask, and the second pattern 23 assigned the second color may be transcribed using a second mask. The first and second masks are lithography masks each of which has transparent patterns transmitting light and opaque patterns blocking light. The first and second masks may constitute a double patterning mask set together and may be used to expose a photo resist in the double patterning process of forming respective patterns belonging to the same layer (or formed at the same level).

Referring to FIG. 2B, integrated circuit 20b may be formed using the TPT. Accordingly, the integrated circuit 20b may be formed based on three masks. More specifically, the integrated circuit 20b may include the first patterns 21 and 22, to which the first color is allocated, the second pattern 23, to which the second color is allocated, and third patterns 24 and 25 to which a third color is allocated. The first to third patterns 21 to 25 are patterns belonging to the same layer. In this case, the first to third colors may be different from one another. Accordingly, the first patterns 21 and 22, the second pattern 23, and the third patterns 24 and 25 may be formed using three different masks, respectively.

Referring to FIGS. 2A and 2B, the two first patterns 21 and 22 to which the first color is allocated may satisfy a first spacing condition. In other words, a space between the two first patterns 21 and 22 to which the first color is allocated may be greater than or equal to a first spacing S1, that is, a minimum space between patterns to which the same color is allocated. In an example, the first patterns 21 and 22 and the second pattern 23 may be of one cell. In another example, the first pattern 21 may be of a first cell, and the first pattern 22 and the second pattern 23 may be of a second cell. Accordingly, the first and second patterns 21 and 22 may be placed to satisfy a first spacing condition with respect to adjacent cells or a first spacing condition with respect to the same cell in the integrated circuit 20a.

Figure 3:
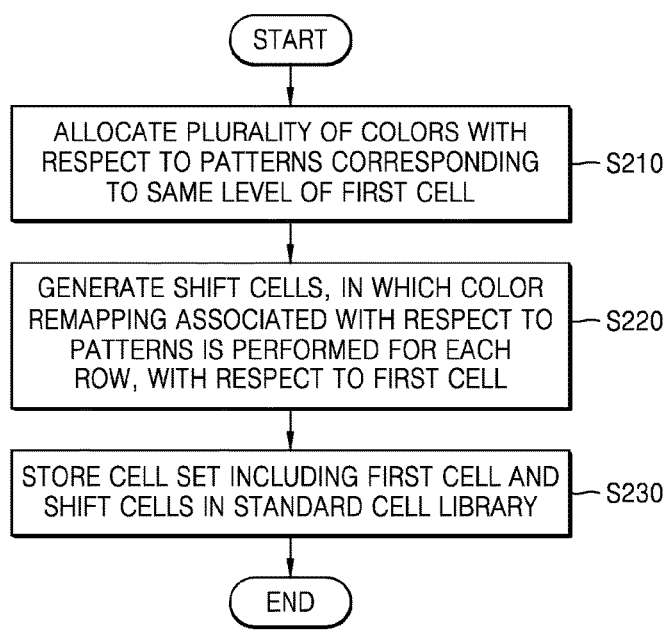
FIG. 3 is a flowchart of a method in designing an IC, according to the inventive concept.

FIG. 3 is a flowchart of an example of a technique in designing an integrated circuit, according to the inventive concept.

Referring to FIG. 3, the technique may be for creating a standard cell library and may correspond, for example, to operation S110 of FIG. 1. Accordingly, the broad description of operation S110 of FIG. 1 applies to the technique of FIG. 3, and thus, will not be repeated here.

In operation S210, colors are allocated to patterns at the same level of a first cell. Operation S210 may be the color decomposition operation or coloring operation described with reference to FIG. 1. In an example, the first cell may be a single height cell having a dimension corresponding to that (the width) of a cell placement row (hereinafter, referred to simply as a "row") of the layout. In other words, the single height cell fits within one row. The single height cell will be described with reference to FIGS. 4 and 5. In another example, the first cell may be a multi-height cell corresponding to a plurality of rows. In other words, the multi-height cell occupies a plurality of rows in the layout. The multi-height cell will be described with reference to FIGS. 6 and 8.

In operation S220, shift cells in which a color remapping operation is performed with respect to patterns for each row are created with respect to the first cell. In this case, the number of shift cells may be determined on the basis of the number of rows occupied by the first cell. In the case where the number of rows occupied by the first cell is "N", the number of shift cells corresponding to the first cell may be ($2^N$–1). In operation S230, a cell set that includes the first cell and the shift cells is stored in the standard cell library.

Figure 4:
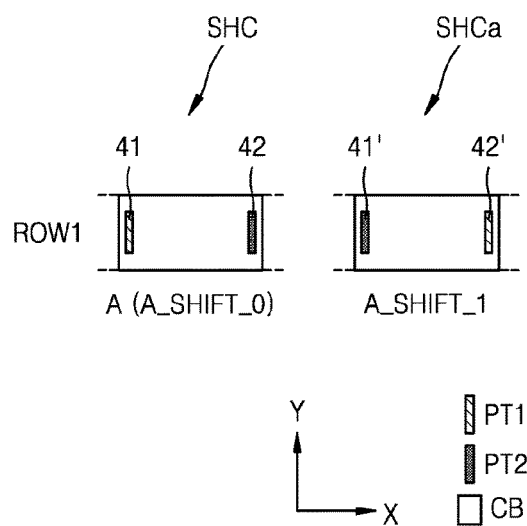
FIG. 4 illustrates layouts of a single height cell and a shift cell of the single height cell.

FIG. 4 illustrates a layout of a single height cell SHC and a shift cell SHCa of the single height cell SHC.

Referring to FIG. 4, in an example, the first cell created in the process FIG. 3 may be the single height cell SHC. For example, the single height cell SHC may be placed over a first row ROW1 First and second patterns 41 and 42 exemplified in FIG. 4 may be patterns that belong to the same layer of the single height cell SHC.

More specifically, the single height cell SHC may include the first pattern 41 and the second pattern 42 that belong to one layer. The first pattern 41 may have a first color, and the second pattern 42 may have a second color. In this case, the first and second patterns 41 and 42 may be formed using different masks. In an example, the first pattern 41 may be placed to be adjacent to a left boundary of the single height cell SHC, and the second pattern 42 may be placed to be adjacent to a right boundary thereof. For descriptive convenience, only two patterns 41 and 42 are illustrated in FIG. 4. However, the single height cell SHC may include more patterns belonging to the layer.

The shift cell SHCa may be generated by performing a color remapping operation with respect to first and second different colors that are allocated to the first and second patterns 41 and 42 of the single height cell SHC. That is, the shift cell SHCa may be generated by inverting, that is, swapping, the first and second different colors that are allocated to the first and second patterns of the single height cell SHC. Accordingly, the shift cell SHCa may include a first inverted pattern 41' adjacent to the left boundary thereof and a second inverted pattern 42' adjacent to the right boundary thereof.

Figure 5:
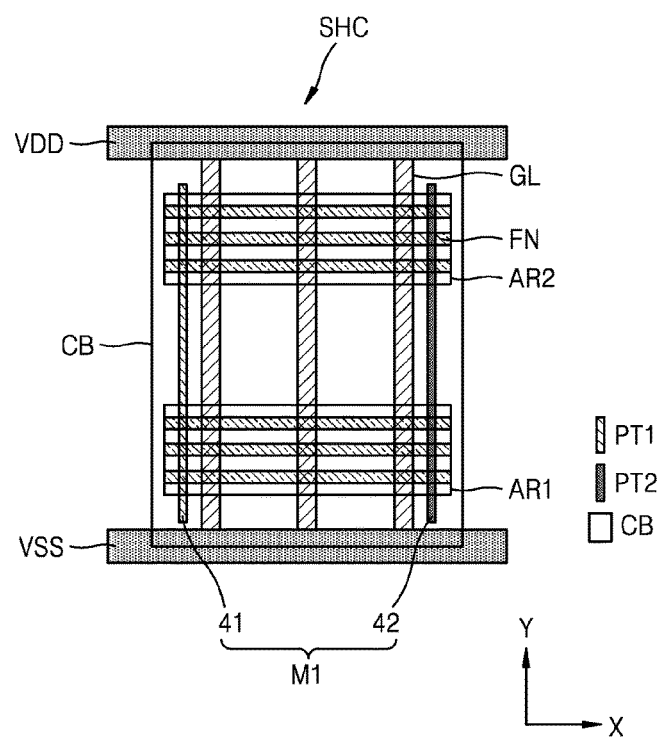
FIG. 5 is a layout of the single height cell of FIG. 4 in more detail.

FIG. 5 is a layout of the single height cell SHC of FIG. 4 in more detail.

Referring to FIG. 5, the single height cell SHC may be limited by or confined to a cell boundary CB and may include a plurality of fins FN, first and second active regions AR1 and AR2, a plurality of gate lines GL, and a plurality of first metal lines M1. The cell boundary CB may be an outline of a footprint of a standard cell, i.e., limits a standard cell (the single height cell SHC in this case) to a certain area. A placement and routing tool may recognize the single height cell SHC by using the cell boundary CB. The cell boundary CB has four boundary lines.

The plurality of fins FN may extend parallel in a first direction (e.g., an X-direction) and may be spaced from one another along a second direction (e.g., a Y-direction) perpendicular to the first direction. The first active region AR1 and the second active region AR2 may be placed in parallel with each other and may have different conductivity types. More specifically, in an example, three fins FN may be placed in each of the first and second active regions AR1 and AR2. However, examples are not limited thereto. For example, other numbers of fins FN placed in each of the first and second active regions AR1 and AR2.

In this case, the plurality of fins FN placed in the first and second active regions AR1 and AR2 may be referred to as "active fins". Only active fins are illustrated in FIG. 5. However, examples are not limited thereto. For example, the single height cell SHC may further include dummy fins that are placed between the cell boundary CB and the first active region AR1, between the first and second active regions AR1 and AR2, or between the second active region AR2 and the cell boundary CB.

The plurality of gate lines GL may extend parallel in the second direction (e.g., the Y-direction) and may be spaced from one another along the first direction (e.g., the X-direction). In this case, the gate lines GL may be formed of a material of a conductive property, for example, polysilicon, metal, or metal alloy. An example is illustrated in FIG. 5 in which the single height cell SHC includes three gate lines GL. However, examples are not limited thereto. For example, the single height cell SHC may include four or more gate lines that extend in the second direction and are spaced from one another along the first direction.

The plurality of first metal lines M1 may constitute one layer arranged on the plurality of gate lines GL. The plurality of first metal lines M1 may include the first pattern 41 and the second pattern 42. In other words, the color decomposition operation may be performed with respect to two colors that are allocated to the plurality of patterns 41 and 42 of the plurality of first metal lines M1.

Figure 6:
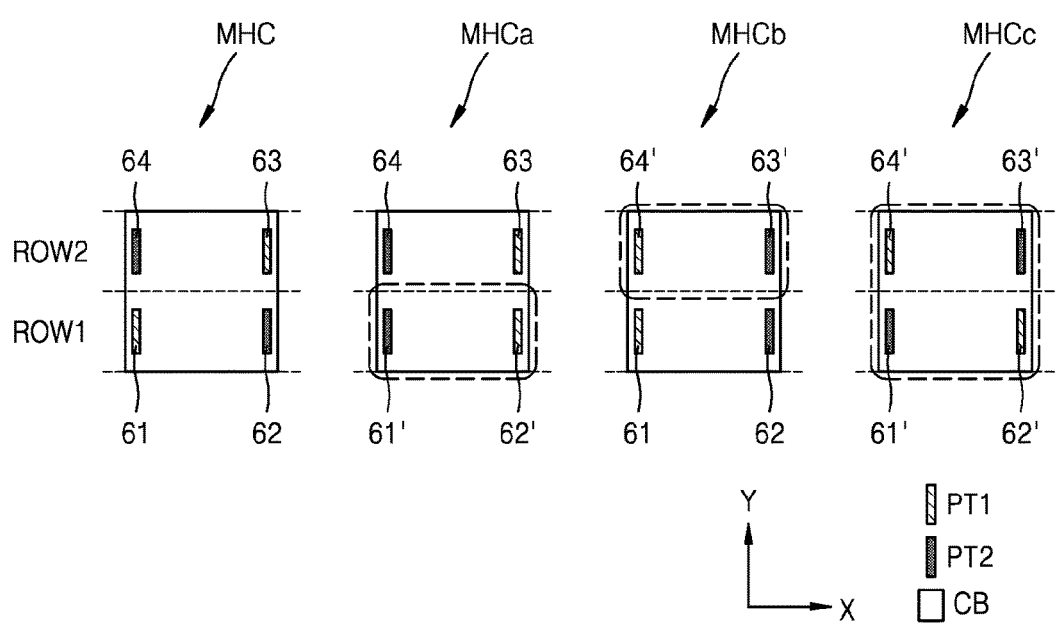
FIG. 6 illustrates layouts of a multi-height cell and shift cells of the multi-height cell.

FIG. 6 illustrates layouts of a multi-height cell MHC and shift cells MHCa, MHCb, and MHCc of the multi-height cell MHC.

Referring to FIG. 6, in an example, the first cell subjected to the process of FIG. 3 may be the multi-height cell MHC. For example, the multi-height cell MHC may be placed over first and second rows ROW1 and ROW2. First and second patterns 61 to 64 exemplified in FIG. 6 may be patterns that constitute the same layer of the multi-height cell MHC.

More specifically, the multi-height cell MHC may include the first patterns 61 and 63 and the second patterns 62 and 64 that correspond to one layer. The first patterns 61 and 63 may have a first color, and the second patterns 62 and 64 may have a second color. Therefore, the first patterns 61 and 63 and the second patterns 62 and 64 may be formed by using different masks. In an example, in the first row ROW1, the first pattern 61 may be placed to be adjacent to a left boundary of the multi-height cell MHC, and the second pattern 62 may be placed to be adjacent to a right boundary thereof; in the second row ROW2, the second pattern 64 may be placed to be adjacent to the left boundary of the multi-height cell MHC, and the first pattern 63 may be placed to be adjacent to the right boundary thereof. For descriptive convenience, only four patterns 61 to 64 are illustrated in FIG. 6. However, the multi-height cell MHC may include more patterns corresponding to one layer.

A first shift cell MHCa may be generated by performing the color remapping operation with respect to first and second different colors that are respectively allocated to the first and second patterns 61 and 62 corresponding to the first row ROW1 of the multi-height cell MHC. That is, the first shift cell MHCa may be generated by inverting, that is, swapping, the first and second different colors that are respectively allocated to the first and second patterns 61 and 62 corresponding to the first row ROW1 of the multi-height cell MHC. On the other hand, the first and second different colors that are respectively allocated to the first and second patterns 63 and 64 corresponding to the second row ROW2 of the multi-height cell MHC are not inverted. Accordingly, the first shift cell MHCa may include a first inverted pattern 61' and a second inverted pattern 62' corresponding to the first row ROW1 and the first pattern 63 and the second pattern 64 corresponding to the second row ROW2.

A second shift cell MHCb may be generated by performing the color remapping operation with respect to the first and second different colors that are respectively allocated to the first and second patterns 63 and 64 corresponding to the second row ROW2 of the multi-height cell MHC. That is, the second shift cell MHCb may be generated by inverting, that is, swapping, the first and second different colors that are respectively allocated to the first and second patterns 63 and 64 corresponding to the second row ROW2 of the multi-height cell MHC. In this case, the first and second different colors that are allocated to the first and second patterns 61 and 62 corresponding to the first row ROW1 of the multi-height cell MHC are not inverted. Accordingly, the second shift cell MHCb may include the first pattern 61 and the second pattern 62 corresponding to the first row ROW1 and a first inverted pattern 63' and a second inverted pattern 64' corresponding to the second row ROW2.

A third shift cell MHCc may be generated by performing the color remapping operation with respect to the first and second different colors that are respectively allocated to the first and second patterns 61 and 62 corresponding to the first row ROW1 of the multi-height cell MHC and with respect to the first and second different colors that are respectively allocated to the first and second patterns 63 and 64 corresponding to the second row ROW2 of the multi-height cell MHC. That is, the third shift cell MHCc may be generated by inverting, that is, swapping, the first and second different colors that are respectively allocated to the first and second patterns 61 and 62 corresponding to the first row ROW1 of the multi-height cell MHC and the first and second different colors that are respectively allocated to the first and second patterns 63 and 64 corresponding to the second row ROW2 of the multi-height cell MHC. Accordingly, the third shift cell MHCc may include the first inverted pattern 61' and the second inverted pattern 62' corresponding to the first row ROW1 and the first inverted pattern 63' and the second inverted pattern 64' corresponding to the second row ROW2.

Figure 7A:
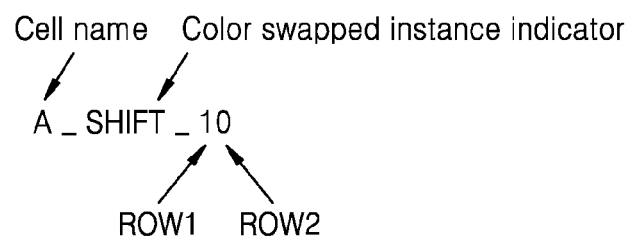
FIG. 7A is illustrates an example of a naming rule for a cell.

FIG. 7A illustrates an example of a naming rule for a cell, and FIG. 7B is a table illustrating various naming rules for a cell.

Referring to FIG. 7A, in an example, names of a standard cell and shift cells are created according to the naming rule, and the standard and shift cells that respectively correspond to the created names may be stored in the standard cell library. In this case, the names of the standard and shift cells created according to the naming rule may be shared between a provider of the standard cell library and a user of the placement and routing tool. Accordingly, the user of the placement and routing tool may create an instance on the basis of the naming rule when remapping colors of a specific row during the color remapping process, and the provider of the standard cell library may provide a shift cell, in which the colors of the row are remapped, in response to the instance.

According to the naming rule, names of the standard and shift cells may include a name (e.g., "A") of a cell, a color-swapped instance indicator (e.g., SHIFT), and a flag indicating color remapping information for respective rows, in this order. In an example, in the case where the number of rows corresponding to a cell is "N", the flag may be expressed with N bits. In an example, in the case where no color remapping operation is performed with respect to patterns corresponding to each row, that is, in the case wherein the patterns corresponding to each row are original patterns, a bit corresponding to each row may be expressed with "0". In the case where the color remapping operation is performed with respect to patterns corresponding to each row, a bit corresponding to each row may be expressed with "1". For example, the flag may be an expression "10" when the color inverting operation is performed with respect to patterns corresponding to the first row ROW1 and no color inverting operation is performed with respect to patterns corresponding to the second row ROW2.

Names that are created with respect to the multi-height cell MHC and the first to third shift cells MHCa to MHCc of FIG. 6 based on the naming rules according to various examples are exemplified in FIG. 7B.

In a first case CASE1, a flag indicating color remapping information for each row may be expressed with bits the number of which is equal to the number (i.e., "N") of rows corresponding to a cell. With respect to an original cell, that is, the multi-height cell MHC, no color inverting operation is performed with respect to patterns corresponding to the first and second rows ROW1 and ROW2. Therefore, the name created for the multi-height cell MHC may be "A_SHIFT_00". With respect to the first shift cell MHCa, the color remapping operation is performed with respect to patterns corresponding to the first row ROW1 and is not performed with respect to patterns corresponding to the second row ROW2. Therefore, the name created for the first shift cell MHCa may be "A_SHIFT_10". With respect to the second shift cell MHCb, the color remapping operation is not performed with respect to the patterns corresponding to the first row ROW1 and is performed with respect to the patterns corresponding to the second row ROW2. Therefore, the name created for the second shift cell MHCb may be "A_SHIFT_01". With respect to the third shift cell MHCc, the color remapping operation is performed with respect to the patterns corresponding to the first and second rows ROW1 and ROW2. Therefore, the name created for the third shift cell MHCc may be "A_SHIFT_11".

In a second case CASE2, a flag indicating color remapping information for each row may be expressed with one alphabetic letter. For example, the name created for the multi-height cell MHC may be "A_SHIFT_a", the name created for the first shift cell MHCa may be "A_SHIFT_b", the name created for the second shift cell MHCb may be "A_SHIFT_c", and the name created for third shift cell MHCc may be "A_SHIFT_d".

In a third case CASE3, a flag indicating color remapping information for each row may be expressed with a number. For example, the name created for the multi-height cell MHC may be "A_SHIFT_1", the name created for the first shift cell MHCa may be "A_SHIFT_2", the name created for the second shift cell MHCb may be "A_SHIFT_3", and the name created for the third shift cell MHCc may be "A_SHIFT_4".

Figure 8:
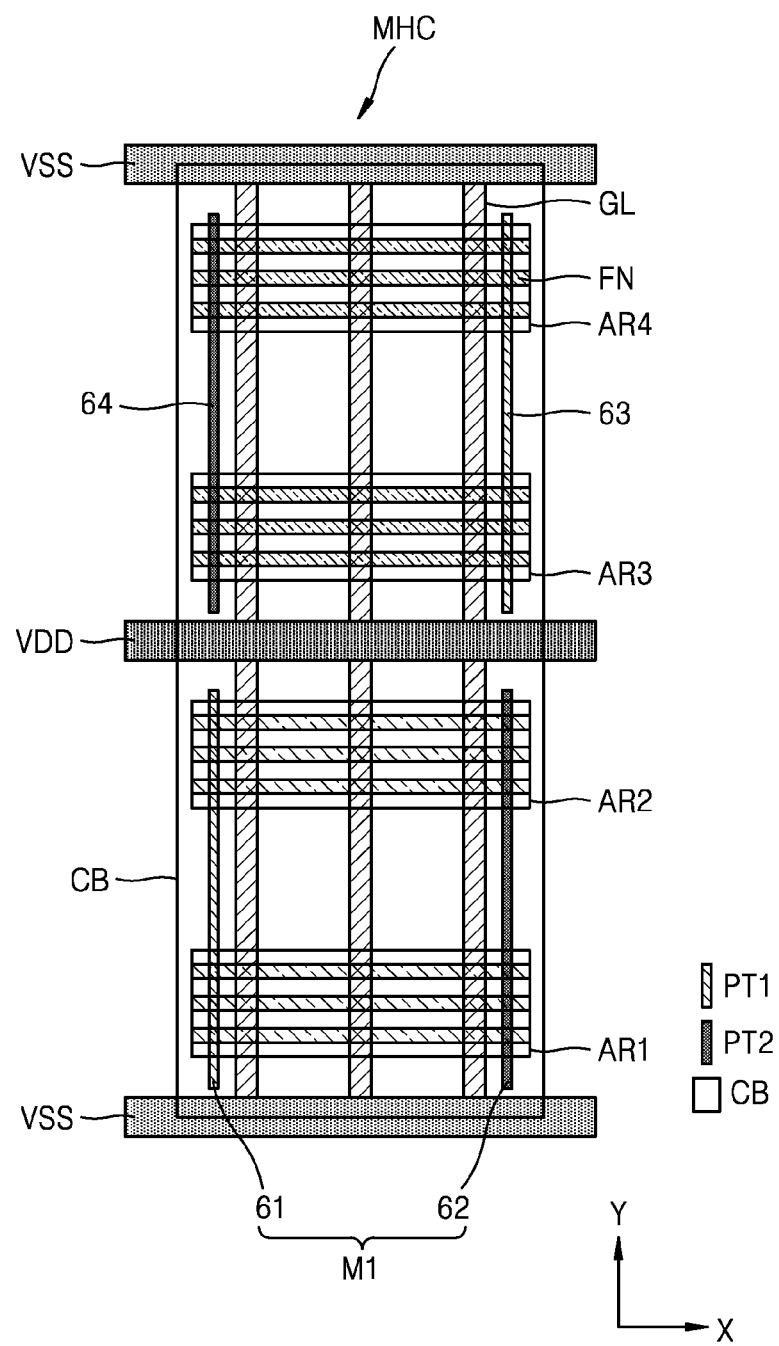
FIG. 8 is a layout of a multi-height cell of FIG. 6 in more detail.

FIG. 8 is a layout of the multi-height cell MHC of FIG. 6 in more detail.

Referring to FIG. 8, the multi-height cell MHC may be limited by a cell boundary CB and may include a plurality of fins FN, first to fourth active regions AR1 to AR4, a plurality of gate lines GL, and a plurality of first metal lines M1. The cell boundary CB may be an outline that establishes special limits, i.e., a footprint of, a standard cell (in this case, the multi-height cell MHC. The placement and routing tool may recognize the multi-height cell MHC by using the cell boundary CB. The cell boundary CB has four boundary lines.

The plurality of fins FN may extend parallel in a first direction (e.g., an X-direction) and may be space from one another along a second direction (e.g., a Y-direction) perpendicular to the first direction. The first to fourth active regions AR1 to AR4 may be placed in parallel with one another. For example, the first and fourth active regions AR1 and AR4 may be formed by doping a substrate with dopants (or impurities) of a first conductivity type, and the second and third active regions AR2 and AR3 may be formed by doping the substrate with dopants (or impurities) of a second conductivity type different from the first conductivity type. In an example, three fins FN may be placed in each of the first to fourth active regions AR1 to AR4. However, examples are not limited thereto. That is, other numbers of fins FN may be placed in each of the first to fourth active regions AR1 to AR4.

In this case, the plurality of fins FN placed in each of the first to fourth active regions AR1 to AR4 may be referred to as "active fins". Only active fins are illustrated in FIG. 8. However, examples are not limited thereto. For example, the multi-height cell MHC may further include dummy fins that are placed between the cell boundary CB and the first active region AR1, between the first and second active regions AR1 and AR2, between the second and third active regions AR2 and AR3, between the third and fourth active regions AR3 and AR4, or between the fourth active region AR4 and the cell boundary CB.

The plurality of gate lines GL may extend parallel in the second direction (e.g., the Y-direction) and may spaced from one another along the first direction (e.g., the X-direction). In this case, the gate lines GL may be formed of a material of a conductive property, for example, polysilicon, metal, or metal alloy.

The plurality of first metal lines M1 may constitute one layer arranged on the plurality of gate lines GL. The plurality of first metal lines M1 may include the first patterns 61 and 63 and the second patterns 62 and 64. In other words, the color decomposition operation may be performed such that two colors are allocated to the plurality of patterns 61 to 64 of the plurality of first metal lines M1.

Figure 9:
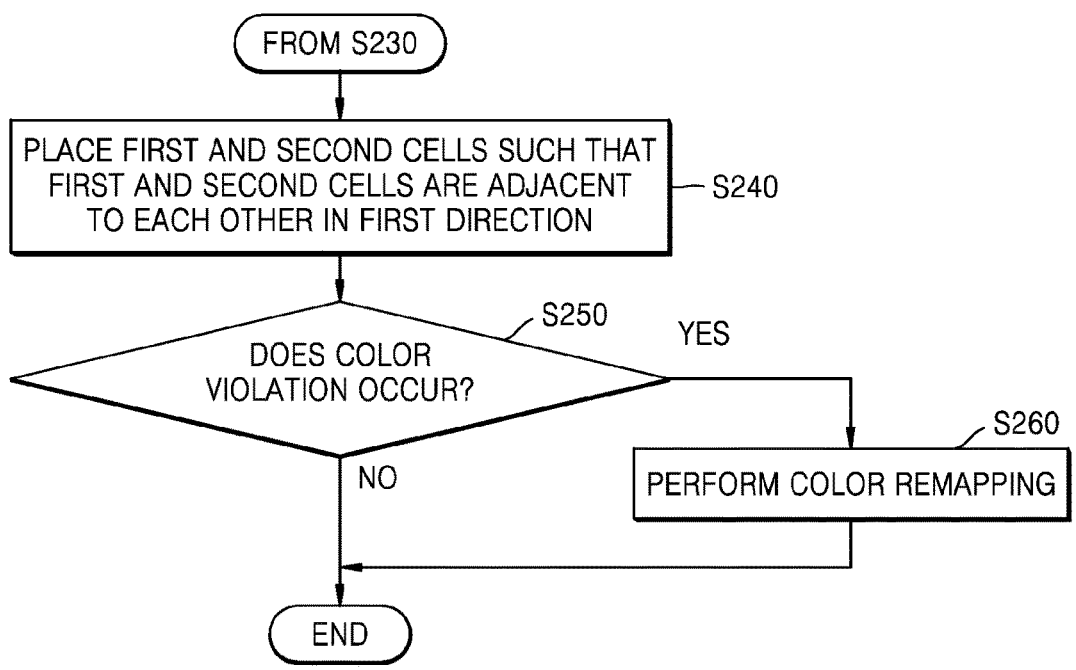
FIG. 9 is a flowchart of a method in designing an IC, according to the inventive concept.

FIG. 9 is a flowchart of an example of an operation of placing and routing standard cells and may correspond, for example, to operation S120 of FIG. 1. Accordingly, a description of FIG. 1 applies to FIG. 9, and thus will not be repeated here. Furthermore, the operation of FIG. 9 may be performed after operation S230 of FIG. 3. Accordingly, a description of FIGS. 3 to 8 applies to the part of the method preceding the operation of FIG. 9, and thus, will not be repeated here.

In operation S240, first and second cells are placed to be adjacent to each other in the first direction. Accordingly, the first and second cells may be placed to be adjacent to each other at a first boundary. Operation S240 may be the placement operation described with reference to FIG. 1. Here, the first direction may be a row direction (e.g., the X-direction of FIGS. 10A and 10B). In an example, the first cell may be a cell shown as placed at the left of FIG. 10A, 10B, or 10C, and the second cell may be a cell shown as placed at the right of FIG. 10A, 10B, or 10C. In an example, a color remapping direction may be a direction from the first cell to the second cell. In an example, the color remapping direction may be a direction from the second cell to the first cell.

In an example, the first cell may be a multi-height cell, and the second cell may be a single height cell. This will be described with reference to FIG. 10A. In an example, the first cell may be a single height cell, and the second cell may be a multi-height cell. This will be described with reference to FIG. 10B. In an example, the first and second cells may be multi-height cells. This will be described with reference to FIG. 10C. However, examples are not limited thereto. For example, the first and second cells may be single height cells.

In operation S250, whether a color violation occurs is determined. Here, the color violation occurs when a space between patterns to which the same color is allocated does not satisfy the first spacing condition. The color violation may also be referred to as a "color conflict". Here, the first spacing condition may be a minimum space between patterns to which the same color is allocated. To satisfy the first spacing condition, the distance between patterns to which the same color is allocated must be at least a first predetermined distance (referred to hereinafter as a "first spacing").

More specifically, whether the distance between a pattern of the first cell adjacent to a first boundary and a pattern of the second cell adjacent to the first boundary is greater than or equal to the first spacing, that is, the minimum space between patterns to which the same color is allocated, may be determined. If the distance is smaller than the first spacing, that is, if the space does not satisfy the first spacing condition, a color violation is determined as occurring between the first cell and the second cell. In the case where the determination result indicates that the color violation occurs, the method proceeds to operation S260; in the case where the determination result indicates there is no color violation, the method ends.

In operation S260, the color remapping operation is performed. In an example, the color remapping operation may be performed with respect to patterns corresponding to a specific row at which the color violation occurs. In this case, an instance notifying the color remapping operation for the patterns corresponding to the specific row may be generated, and the color remapping operation may be performed by using a shift cell, which is selected according to the instance, from among a plurality of shift cells stored in the standard cell library.

Figure 10A:
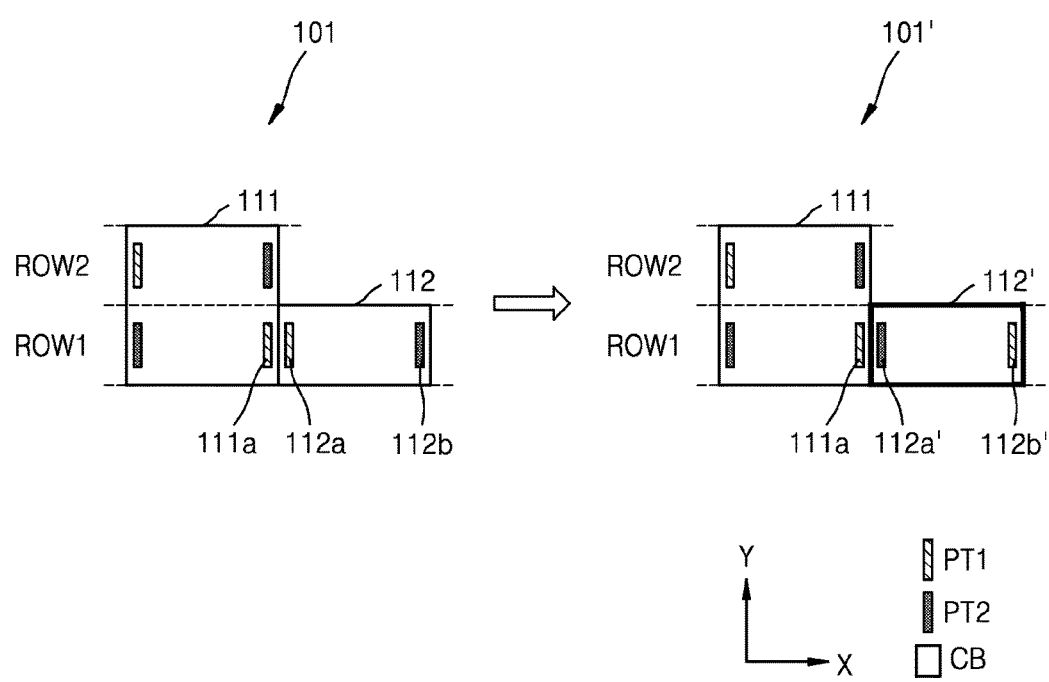
FIGS. 10A to 10C are conceptual diagrams of examples of cells placed and remapped according to the method of FIG. 9.
Figure 10B:
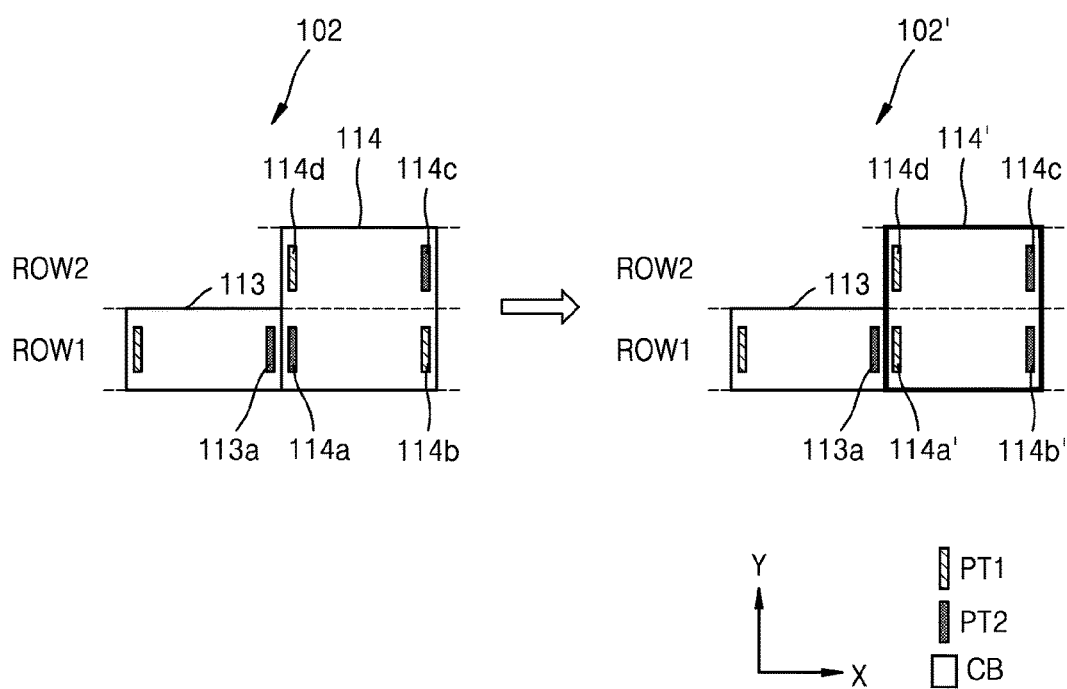
Figure 10C:
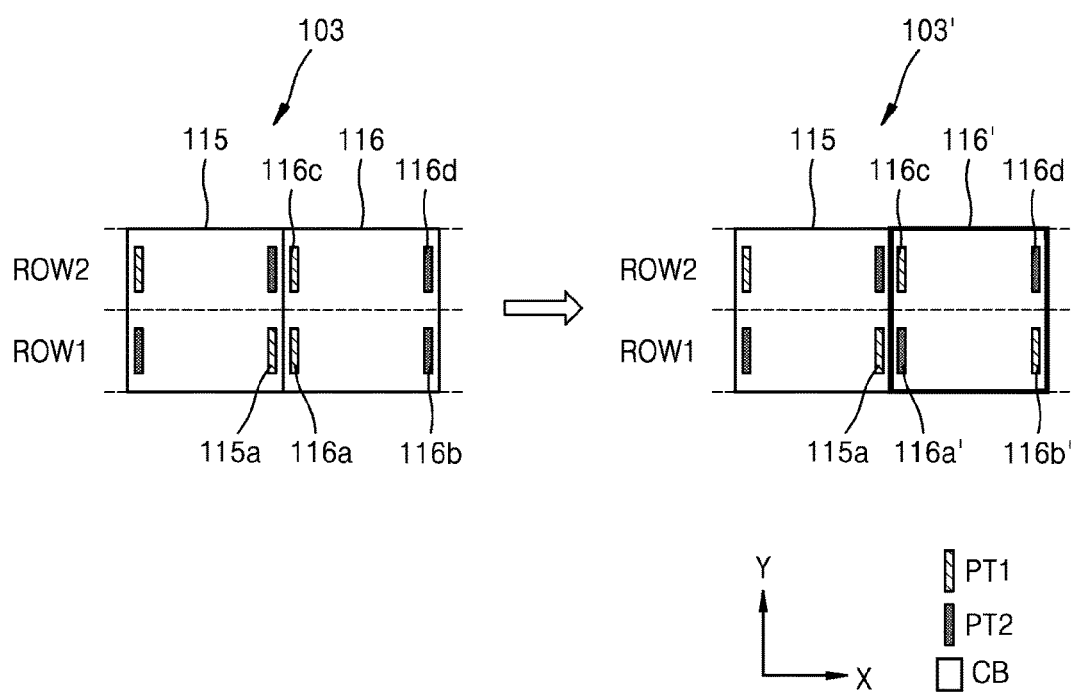

FIGS. 10A to 10C illustrate cells placed according to the method of FIG. 9.

Referring to FIG. 10A, a cell placement 101 according to operation S240 of FIG. 9 includes a first cell 111 and a second cell 112. The first cell 111 is a multi-height cell corresponding to the first and second rows ROW1 and ROW2, and the second cell 112 is a single height cell corresponding to the first row ROW1. In an example, a color remapping direction may be a direction from the first cell 111 to the second cell 112. A result of determining, in operation S250 of FIG. 9, whether the color violation is generated may indicate that the color violation is generated between a first pattern 111a of the first cell 111 in the first row ROW1 and a first pattern 112a of the second cell 112 therein.

A cell placement 101' that is obtained by performing the color remapping operation according to operation S260 of FIG. 9 includes the first cell 111 and a second inverted cell 112'. In other words, the second cell 112 of the cell placement 101 may be replaced by the color remapping operation with the second inverted cell 112'. Here, the second inverted cell 112' may be a shift cell in which the color remapping operation is performed with respect to patterns of the second cell 112 that correspond to the first row ROW1.

Referring to FIG. 10B, a cell placement 102 according to operation S240 of FIG. 9 includes a first cell 113 and a second cell 114. The first cell 113 is a single height cell corresponding to the first row ROW1, and the second cell 114 is a multi-height cell corresponding to the first and second rows ROW1 and ROW2. In an example, a color remapping direction may be a direction from the first cell 113 to the second cell 114. A result of determining, in operation S250 of FIG. 9, whether the color violation is generated may indicate that the color violation is generated between a second pattern 113a of the first cell 113 in the first row ROW1 and a second pattern 114a of the second cell 114 therein.

A cell placement 102' that is obtained by performing the color remapping operation according to operation S260 of FIG. 9 includes the first cell 113 and a second inverted cell 114'. In other words, the second cell 114 of the cell placement 102 may be replaced by the color remapping operation with the second inverted cell 114'. Here, the second inverted cell 114' may be a shift cell in which the color remapping operation is performed with respect to patterns of the second cell 114 that correspond to the first row ROW1 and may be received from the standard cell library.

Referring to FIG. 10C, a cell placement 103 according to operation S240 of FIG. 9 includes a first cell 115 and a second cell 116. The first cell 115 is a multi-height cell corresponding to the first and second rows ROW1 and ROW2, and the second cell 116 is a multi-height cell corresponding to the first and second rows ROW1 and ROW2. In an example, a color remapping direction may be a direction from the first cell 115 to the second cell 116. A result of determining, in operation S250 of FIG. 9, whether the color violation is generated may indicate that the color violation is generated between a first pattern 115a of the first cell 115 in the first row ROW1 and a first pattern 116a of the second cell 116 therein.

A cell placement 103' that is obtained by performing the color remapping operation according to operation S260 of FIG. 9 includes the first cell 115 and a second inverted cell 116'. In other words, the second cell 116 of the cell placement 103 may be replaced by the color remapping operation with the second inverted cell 116'. Here, the second inverted cell 116' may be a shift cell in which the color remapping operation is performed with respect to patterns of the second cell 116 that correspond to the first row ROW1 and is not performed with respect to patterns of the second cell 116 that correspond to the second row ROW2 and may be received from the standard cell library.

Figure 11:
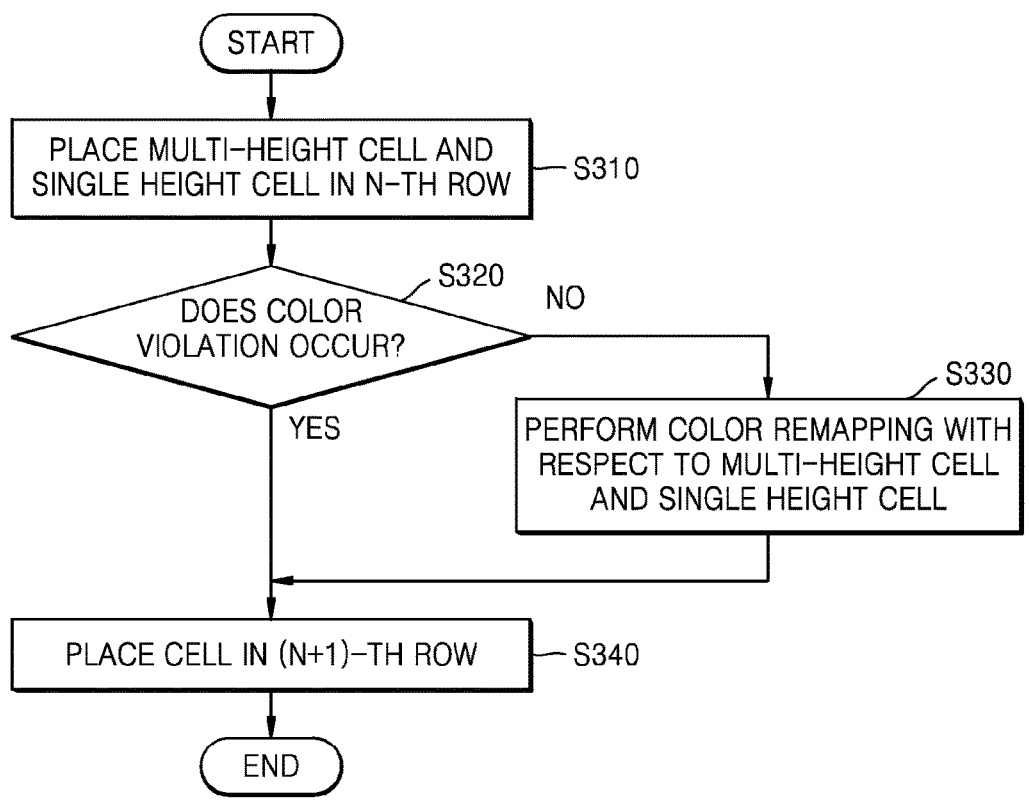
FIG. 11 is a flowchart of a method in designing an IC, according to the inventive concept.

FIG. 11 is a flowchart of an example of an operation of placing standard cells and may correspond, for example, to operation S120 of FIG. 1. Accordingly, the description of FIG. 1 applies to of FIG. 11, and thus, will not be repeated here.

In operation S310, a multi-height cell and a single height cell are placed in an n-th row. Here, "n" is 0 or a positive integer. More specifically, the multi-height cell and the single height cell may be placed to be adjacent to each other in the first direction. Accordingly, the multi-height cell and the single height cell may be placed to be adjacent to each other at a first boundary. Here, the first direction may be the row direction (e.g., the X-direction of FIGS. 10A to 10C).

In an example, a color remapping direction may follow the first direction. In an example, the multi-height cell may be placed as shown at the left of FIG. 10A, and the single height cell may be placed as shown at the right of FIG. 10A. In this case, if the color violation occurs between the multi-height cell and the single height cell and as a result, the color remapping operation may be performed with respect to the single height cell (e.g., refer to FIG. 10A). In an example, the single height cell may be placed as shown at the left of FIG. 10B, and the multi-height cell may be placed as shown at the right of FIG. 10B. In this case, if the color violation occurs between the multi-height cell and the single height cell, the color remapping operation may be performed with respect to the multi-height height cell (e.g., refer to FIG. 10B).

In operation S320, whether a color violation is generated is determined. Here, the color violation means a case in which a space between patterns to which the same color is allocated does not satisfy the first spacing condition. The color violation may be also referred to as a "color conflict". Here, the first spacing condition may be a minimum space between patterns to which the same color is allocated. To satisfy the first spacing condition, the distance between patterns to which the same color is allocated may be at least the first spacing.

More specifically, whether the distance between a pattern of the first cell adjacent to the first boundary and a pattern of the second cell adjacent to the first boundary is greater than or equal to the first spacing, that is, the minimum space between patterns to which the same color is allocated, may be determined. If the distance is smaller than the first spacing, that is, the first spacing condition is not satisfied, a color violation is determined as occurring between the first cell and the second cell. In the case where the color violation is determined as occurring, the method proceeds to operation S330; in the case where it is determined that no color violation occurs, the method proceeds to S340.

In operation S330, the color remapping operation is performed with respect to the multi-height cell or the single height cell. In an example, a color remapping direction may be a direction from the multi-height cell to the single height cell. In this case, the color remapping operation is performed with respect to the single height cell. More specifically, the color remapping operation may be accomplished by replacing the single height cell with a shift cell in which the color remapping operation is performed with respect to patterns of the single height cell. In an example, a color remapping direction may be a direction from the single height cell to the multi-height cell. In this case, the color remapping operation is performed with respect to the multi-height cell. More specifically, the color remapping operation may be accomplished by replacing the multi-height cell with a shift cell in which the color remapping operation is performed with respect to patterns corresponding to a row where the multi-height cell and the single height cell are adjacent to each other.

In operation S340, cells are placed in a (n+1)-th row. Cells are placed in the n-th row in operations S310 to S330. After the color remapping operation associated with the cells placed in the n-th row is completed, cells are placed in the (n+1)-th row, and the color remapping operation may be performed with respect to the cells placed in the (n+1)-th row.

Figure 12:
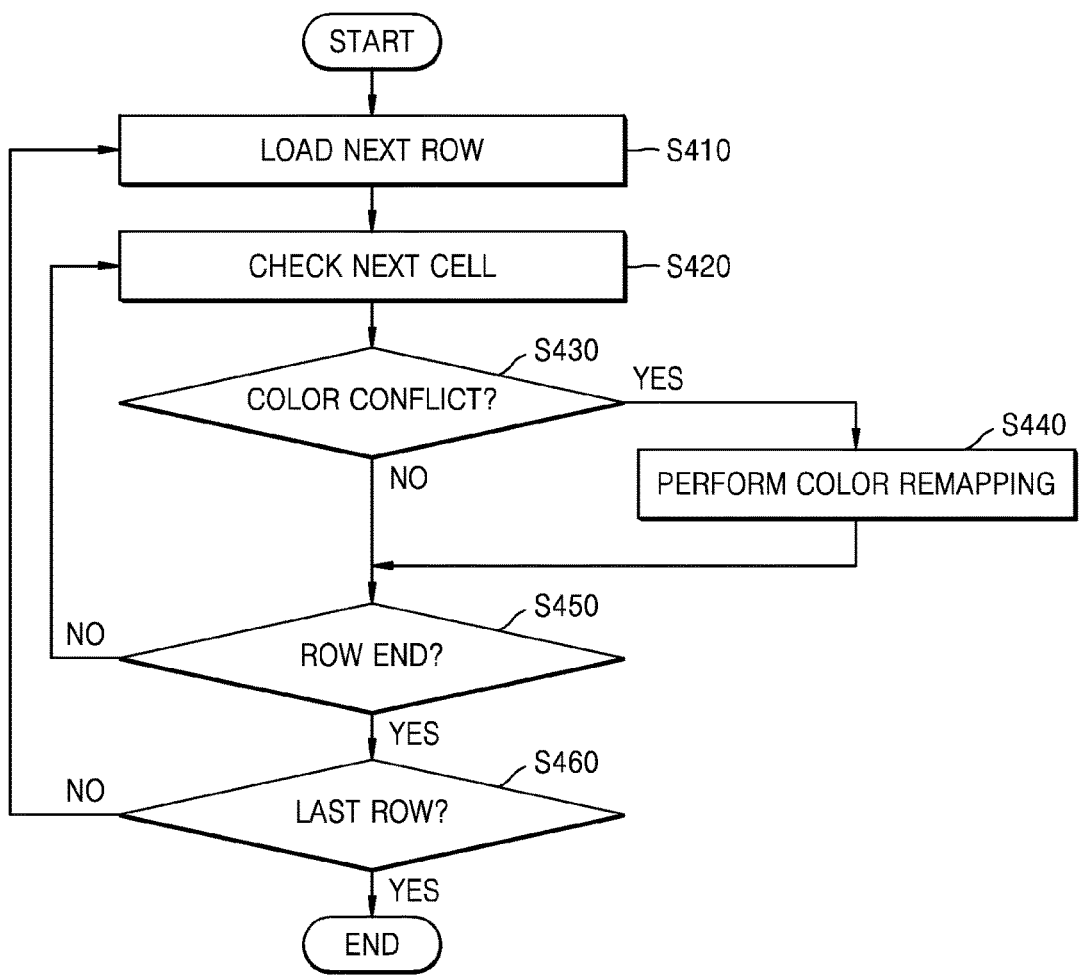
FIG. 12 is a flowchart of a method in designing an IC, according to the inventive concept.

FIG. 12 is a flowchart of an example of an operation of placing and routing standard cells and may correspond, for example, to operation S120 of FIG. 1. Accordingly, the description of FIG. 1 applies to the example of FIG. 11, and thus, will not be repeated here.

In operation S410, a next row is loaded. More specifically, after accessing the standard cell library, cells corresponding to a row are placed. In operation S420, a next cell is checked. More specifically, a cell check operation is performed along the first direction with respect to the plurality of cells corresponding to the loaded row.

In operation S430, whether the color conflict is generated is determined. Operation S440 is performed in the case in which the determination result indicates that the color conflict is generated between the first and second cells that are placed adjacent to each other. Meanwhile, operation S450 is performed in the case in which the determination result indicates that no color conflict is generated between the first and second cells that are placed adjacent to each other.

In operation S440, the color remapping operation is performed. In this case, the color remapping operation may be performed with respect to the cell checked in operation S420. More specifically, the color remapping operation may be accomplished by selecting a shift cell, in which the color inverting operation is performed with respect to patterns corresponding to a specific row where the color conflict is generated, from among a plurality of shift cells stored in the standard cell library and replacing the checked cell with the selected shift cell.

In operation S450, whether the loaded row ends is determined. If the determination result indicates that the loaded row ends, that is, if a cell to be checked does not exist, operation S460 is performed. Meanwhile, if the determination result indicates that the loaded row does not end, that is, if at least one cell to be checked exists, operation S420 is performed. In operation S460, whether the loaded row is the last row is determined. If the determination result indicates that the loaded row is not the last row, operation S410 is performed. Meanwhile, if the determination result indicates that the loaded row is the last row, the method ends.

Figure 13A:
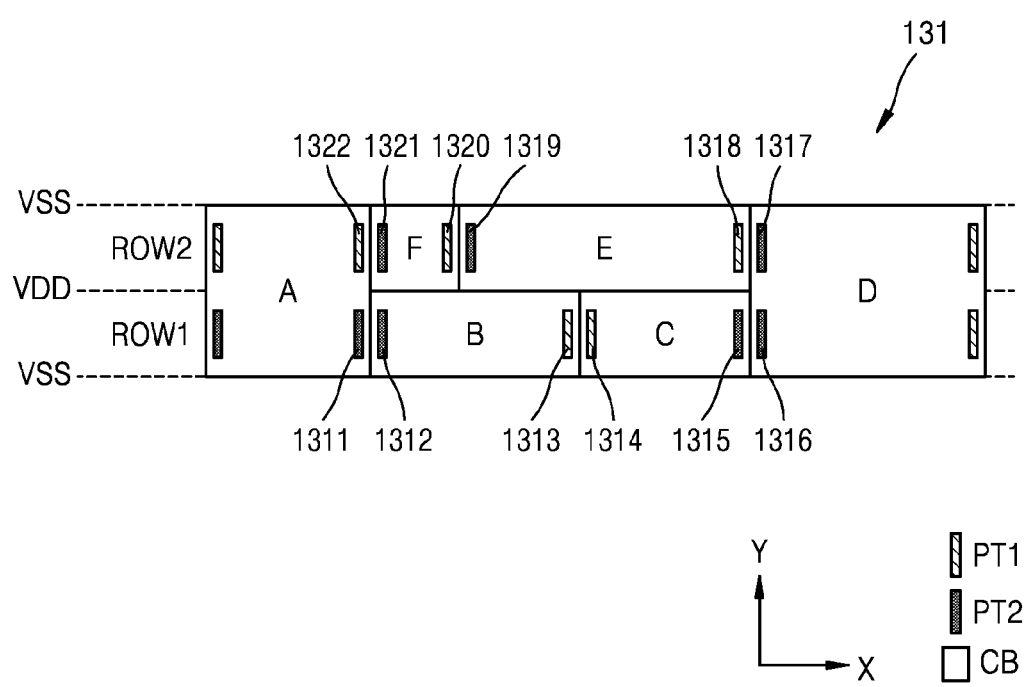
FIG. 13A illustrates an example of an initial layout of cells according the inventive concept.

FIG. 13A illustrates an example of a layout 131 of an IC in which cells are laid out in rows within a footprint, i.e., a region of the layout corresponding to a footprint of the electronic components of the IC formed in conformance with the layout 131. Thus, it will be apparent the term "height" as used throughout the description refers to a dimension of a cell that extends in the widthwise direction of the rows within the footprint (the direction of the Y-axis in FIG. 13A).

Referring to FIG. 13A, the layout 131 may include first to sixth cells "A" to "F" that are placed by performing a cell placement operation with respective to a first row ROW1 and a second row ROW2. Here, the first and fourth cells "A" and "D" may be multi-height cells, e.g., double height cells that are placed in the first and second rows ROW1 and ROW2. Also, the second and third cells "B" and "C" are single height cells placed in the first row ROW1, and the fifth and sixth cells "E" and "F" are single height cells placed in the second row ROW2.

In the first row ROW1, the distance between a pattern 1311 of the first cell "A" and a pattern 1312 of the second cell "B" is smaller than the first spacing. In this case, a color violation is generated between the first cell "A" and the second cell "B". Also, in the first row ROW1, the distance between a pattern 1313 of the second cell "B" and a pattern 1314 of the third cell "C" is smaller than the first spacing. In this case, the color violation is generated between the second cell "B" and the third cell "C". Furthermore, in the first row ROW1, the distance between a pattern 1315 of the third cell "C" and a pattern 1316 of the fourth cell "D" is smaller than the first spacing. In this case, a color violation is generated between the third cell "C" and the fourth cell "D".

In the second row ROW2, because a pattern 1317 of the fourth cell "D" and a pattern 1318 of the fifth cell "E" have different colors, no color violation is generated between the fourth cell "D" and the fifth cell "E". Also, in the second row ROW2, because a pattern 1319 of the fifth cell "E" and a pattern 1320 of the sixth cell "F" have different colors, no color violation is generated between the fifth cell "E" and the sixth cell "F". Also, in the second row ROW2, because a pattern 1321 of the sixth cell "F" and a pattern 1322 of the first cell "A" have different colors, no color violation is generated between the sixth cell "F" and the first cell "A".

Figure 13B:
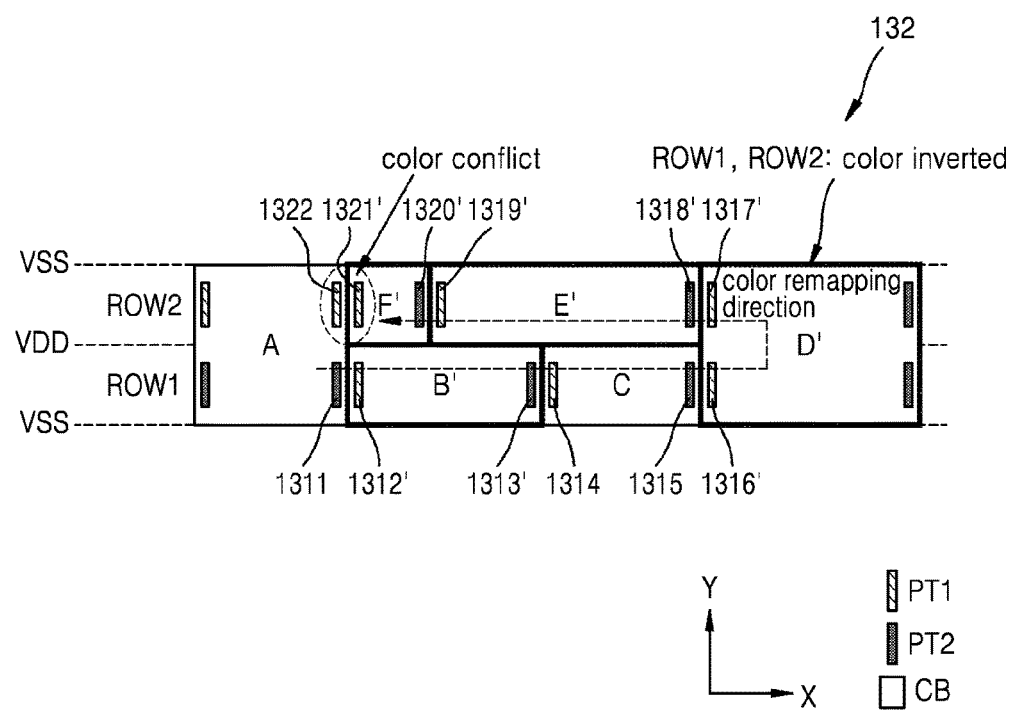
FIG. 13B illustrates a layout subjected to a color remapping operation performed according to a comparative example.

FIG. 13B illustrates a layout 132 in which a color remapping operation is performed according to a comparative example.

Referring to FIG. 13B, the layout 132 may be generated by performing the color remapping operation with respect to the layout 131 exemplified in FIG. 13A. More specifically, the layout 132 may be generated by performing a cell check operation with respect to the layout 131 along a color remapping direction and performing the color remapping operation.

First of all, the second cell "B" may be replaced with a second inverted cell B'. The second inverted cell B' may be a shift cell in which the color remapping operation is performed with respect to patterns of the second cell "B" that correspond to the first row ROW1. Accordingly, no color violation may be generated between the second inverted cell B' and the third cell "C". Then, the fourth cell "D" may be replaced with a fourth inverted cell D'. The fourth inverted cell D' may be a shift cell in which the color remapping operation is performed with respect to all patterns of the fourth cell "D" that correspond to the first and second rows ROW1 and ROW2.

In the second row ROW2, a space between a pattern 1317' of the fourth inverted cell D' and a pattern 1318 of the fifth cell "E" may be smaller than the first spacing. In this case, the color violation may be generated between the fourth inverted cell D' and the fifth cell "E". In this case, the fifth cell "E" may be replaced with a fifth inverted cell E' having patterns. The fifth inverted cell F may be a shift cell in which the color remapping operation is performed with respect to patterns of the fifth cell "E" that correspond to the second row ROW2. That is, in this case, the fifth inverted cell E' has patterns 1318' and 1319' corresponding to the patterns 1318 and 1319 of the fifth cell "E" but with the colors allocated thereto reversed.

In the second row ROW2, a space between a pattern 1319' of the fifth inverted cell E' and a pattern 1320 of the sixth cell "F" may be smaller than the first spacing. In this case, the color violation may be generated between the fifth inverted cell E' and the sixth cell "F". In this case, the sixth cell "F" may be replaced with a sixth inverted cell F'. The sixth inverted cell F' may be a shift cell in which the color remapping operation is performed with respect to patterns of the sixth cell "F" that correspond to the second row ROW2. That is, in this case, the sixth inverted cell F' has patterns 1320' and 1321' corresponding to the patterns 1320 and 1321 of the sixth cell "F" but with the colors allocated thereto reversed.

Accordingly, a space between a pattern 1321' of the sixth inverted cell F' and a pattern 1322 of the first cell "A" may be smaller than the first spacing. In this case, the color violation may be generated between the sixth inverted cell F and the first cell "A". As described above, with regard to cells placed in the first and second rows ROW1 and ROW2, the color remapping operation may be performed from the first cell "A" along the color remapping direction. When the color remapping operation is performed with respect to the sixth cell "F" adjacent to the first cell "A", the color violation may be generated.

In the layout 131 exemplified in FIG. 13A, no color violation may be generated with regard to the fourth, fifth, sixth, and first cells "D", "E", "F", and "A" that are placed in the second row ROW2. However, because the fourth cell "D" is replaced with the fourth inverted cell D' in FIG. 13B, the color violation is generated with regard to the cells D', E, F', and "A" that are placed in the second row ROW2.

In the case where the color remapping operation is performed along the color remapping direction from the multi-height cell, that is, the first cell "A" in the first row ROW1, when a cell to be checked corresponds to another multi-height cell, that is, the fourth cell "D", the color remapping operation may be performed in the direction of the first cell "A", at which the color remapping operation is performed for the first time, in the second row ROW2. In this case, the color conflict may be generated when a cell to be checked corresponds to the first cell "A" at which the color remapping operation is performed for the first time, which is referred to as an "odd cycle".

To solve the odd cycle issue, some of cells between multi-height cells may be moved to other locations, or a padding space may be added between a multi-height cell and a cell adjacent to the multi-height cell. In this case, however, the movement of cells may increase the development time for the IC.

Figure 13C:
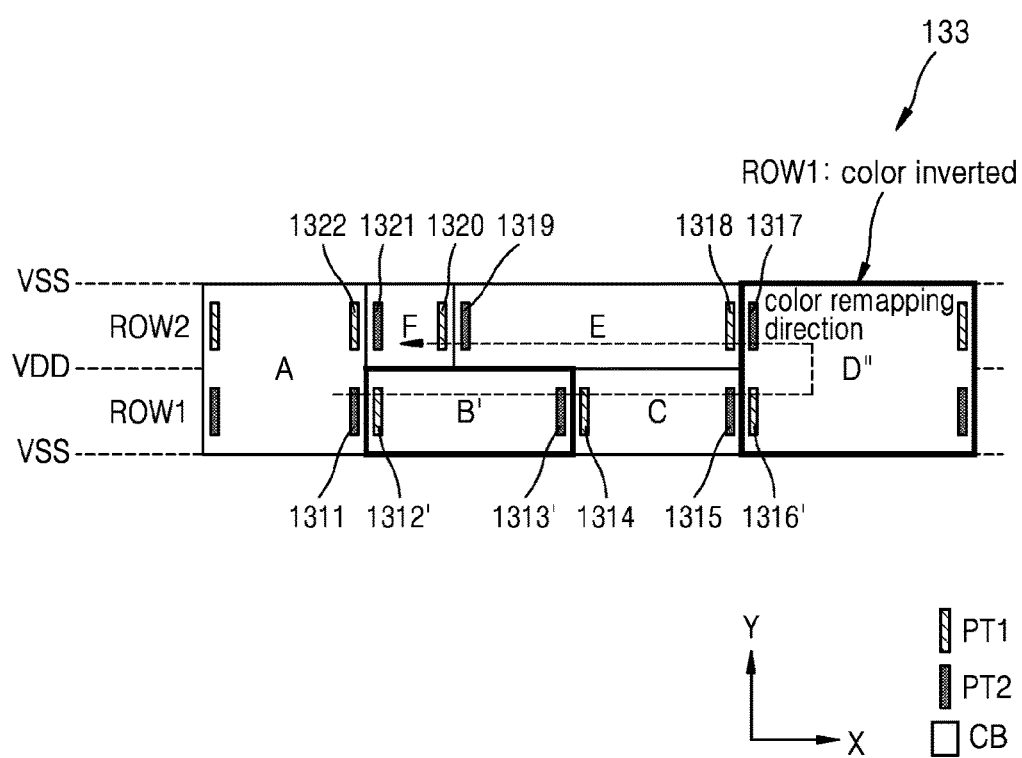
FIG. 13C illustrates a layout subjected to a color remapping operation performed according the inventive concept.

FIG. 13C illustrates a layout 133 in which the color remapping operation is performed according to the inventive concept.

Referring to FIG. 13C, the layout 133 may be generated by performing the color remapping operation with respect to the layout 131 exemplified in FIG. 13A. More specifically, the layout 133 may be generated by performing a cell check operation with respect to the layout 131 along a color remapping direction and performing the color remapping operation by using shift cells in which the color remapping operation is performed for each row.

First of all, the second cell "B" may be replaced with the second inverted cell B'. The second inverted cell B' may be a shift cell in which the color remapping operation is performed with respect to patterns of the second cell "B" that correspond to the first row ROW1. Accordingly, no color violation may be generated between the second inverted cell B' and the third cell "C". Then, according to an example, the fourth cell "D" may be replaced with a fourth inverted cell D". The fourth inverted cell D" may be a shift cell in which the color inverting operation is performed with respect to patterns of the fourth cell "D" that correspond to the first row ROW1 and performing no color inverting operation with respect to patterns of the fourth cell "D" that correspond to the second row ROW2.

Accordingly, in the second row ROW2, because a pattern 1317 of the fourth inverted cell D" and a pattern 1318 of the fifth cell "E" have different colors, no color violation may be generated between the fourth inverted cell D" and the fifth cell "E". Also, because a pattern 1319 of the fifth cell "E" and a pattern 1320 of the sixth cell "F" have different colors, no color violation may be generated between the fifth cell "E" and the sixth cell "F". Also, in the second row ROW2, because a pattern 1321 of the sixth cell "F" and a pattern 1322 of the first cell "A" have different colors, no color violation may be generated between the sixth cell "F" and the first cell "A".

Figure 14:
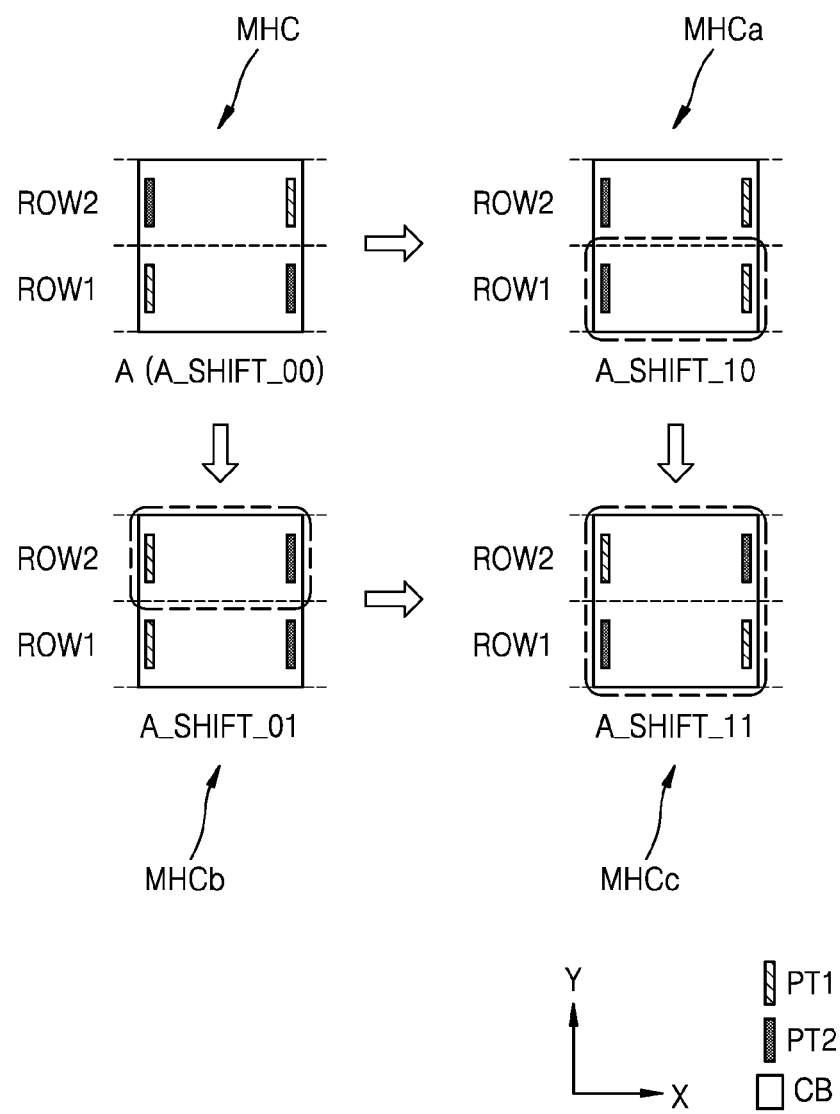
FIG. 14 is a conceptual diagram of an example of a color remapping operation that is performed with respect to a multi-height cell, according to the inventive concept.

FIG. 14 illustrates examples of the color remapping operation that is performed with respect to the multi-height cell MHC, according to an example.

Referring to FIG. 14, in an example, if a result of performing a cell check operation with respect to the multi-height cell MHC indicates that the color violation is generated with regard to the first row ROW1, the multi-height cell MHC is replaced with a first shift cell MHCa. In this case, the first shift cell MHCa, that is a cell in which the color inverting operation is performed with respect to only patterns of the first row ROW1, may be obtained from the standard cell library. Alternatively, if the result of performing the cell check operation with respect to the multi-height cell MHC indicates that the color violation is generated with regard to the second row ROW2, the multi-height cell MHC is replaced with a second shift cell MHCb. In this case, the second shift cell MHCb, that is a cell in which the color inverting operation is performed with respect to only patterns of the second row ROW2, may be obtained from the standard cell library. Alternatively, if the result of performing the cell check operation with respect to the multi-height cell MHC indicates that the color violation is generated with regard to the first and second rows ROW1 and ROW2, the multi-height cell MHC is replaced with a third shift cell MHCc. In this case, the third shift cell MHCc, that is a cell in which the color inverting operation is performed with respect to all patterns of the first and second rows ROW1 and ROW2, may be obtained from the standard cell library.

Figure 15:
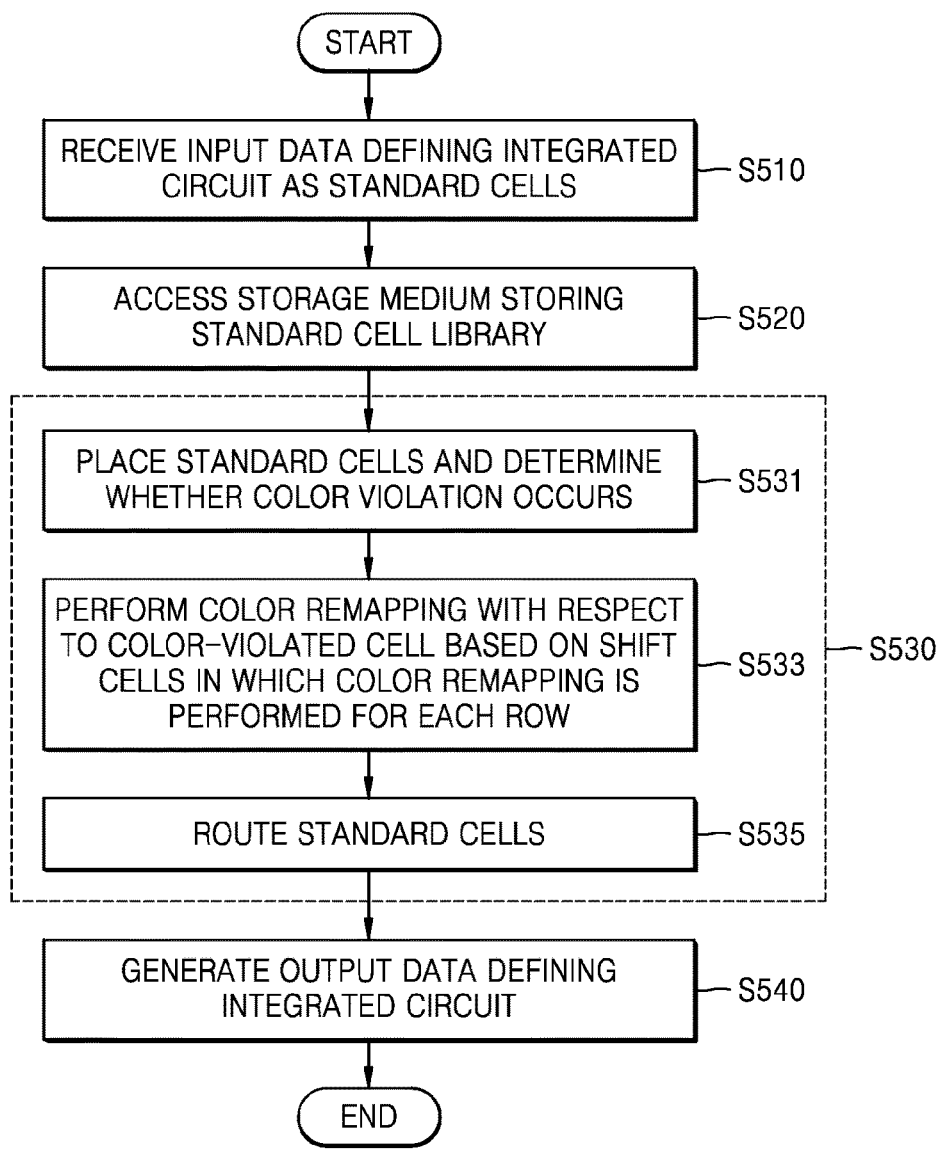
FIG. 15 is a flowchart of an example of a method of designing an IC, according to the inventive concept.

FIG. 15 is a flowchart of an example of an integrated circuit designing method and may correspond, for example, to operation S120 of FIG. 1. Accordingly, the description of FIG. 1 applies to FIG. 15, and thus, will not be repeated here.

In operation S510, input data that defines an integrated circuit as standard cells is received. In operation S520, a storage medium that stores the standard cell library is accessed. In operation S530, the standard cells are placed and routed. In an example, operation S530 may include operations S531 to S535. In operation S531, the standard cell are placed (laid out in rows, for example), and whether a color violation is generated is determined. In operation S533, the color remapping operation is performed for a cell involved in creating a color-violation whereby the cell is replaced with a shift cell which cures the color violation and is selected from among one or more shift cells associated with the cell according to its type. In operation S535, routing associated with the standard cells is performed.

In operation S540, output data that defines the integrated circuit is generated. More specifically, the output data that defines the integrated circuit including standard cells placed and routed according to operation S530 may be generated. According to an example, the output data may have a form including all layout information of standard cells, that is, information about patterns of all layers, for example, a GDS format or may have a form including external information of a standard cell such as pins of the standard cell, for example, an LEF or Milkyway form.

Figure 16:
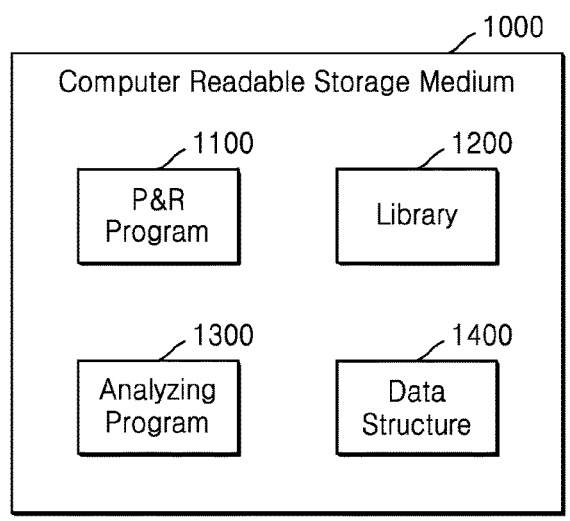
FIG. 16 is a block diagram of examples of a storage medium that can be configured according to the inventive concept.

FIG. 16 is a block diagram of an example of a storage medium 1000 that may be configured according to the inventive concept.

Referring to FIG. 16, the storage medium 1000 that is a non-transitory computer-readable storage medium may include a storage medium that is capable of being read by a computer while providing instructions and/or data to the computer. For example, the non-transitory computer-readable storage medium 1000 may include magnetic or optical media, such as a disk, a tape, a compact disk-read only memory (CD-ROM), a digital versatile disc-read only memory (DVD-ROM), a compact disk readable (CD-R), a compact disk rewritable CD-RW, DVD-R, and DVD-RW, volatile or nonvolatile memories, such as a random access memory (RAM), a ROM, and a flash memory, a nonvolatile memory accessible through a universal serial bus (USB) interface, microelectromechanical systems (MEMS), and the like. The non-transitory computer-readable storage medium 1000 may be capable of being inserted in a computer, may be integrated in the computer, or may be coupled with the computer through a communication medium such as a network and/or a wireless link.

As illustrated in FIG. 16, the non-transitory computer-readable storage medium 1000 may include a placement and routing (P&R) program 1100, a library 1200, an analyzing program 1300, and a data structure 1400.

The P&R program 1100 may include a plurality of instructions to perform a method of designing an integrated circuit by using the standard cell library. For example, the non-transitory computer-readable storage medium 1000 may store the P&R program 1100 that includes commands for designing an integrated circuit by using the standard cell library including standard cells illustrated in one or more of preceding drawings.

In an example, the P&R program 1100 may include instructions for determining whether the color violation is generated, that is, whether the color conflict is generated, in a placement operation. Also, in an example, the P&R program 1100 may include instructions for performing the color remapping operation in the placement operation. Furthermore, in an example, the P&R program 1100 may include instructions for generating an instance that is used to select a shift cell in which the color remapping operation is performed with respect to only patterns corresponding to a row where the color conflict is generated.

The library 1200 may include information about a unit for forming an integrated circuit, that is, information about the standard cell. In an example, the library 1200 may be a standard cell library and may include a standard cell and at least one shift cell corresponding to the standard cell. Here, the shift cell refers to a cell in which the color remapping operation is performed with respect to patterns corresponding to one layer of the standard cell for each row. In the case where the standard cell occupies or is laid out over N rows, the number of shift cells is ($2^N-1$). Here, "N" is an integer of 1 or more.

In an example, the library 1200 may store names of a standard cell and at least one shift cell corresponding to the standard cell, based on any of various naming rules. In an example, the library 1200 may select one of a plurality of shift cells in response to an instance received from the placement and routing tool and may provide the selected shift cell to the placement and routing tool.

The analyzing program 1300 may include a plurality of instructions for performing a method of analyzing an integrated circuit based on data defining an integrated circuit. The data structure 1400 may include a storage space for using the standard cell library of the library 1200, extracting specific information from the standard cell library of the library 1200, or managing data generated in a process of analyzing, by the analyzing program 1300, a characteristic of an integrated circuit.

Figure 17:
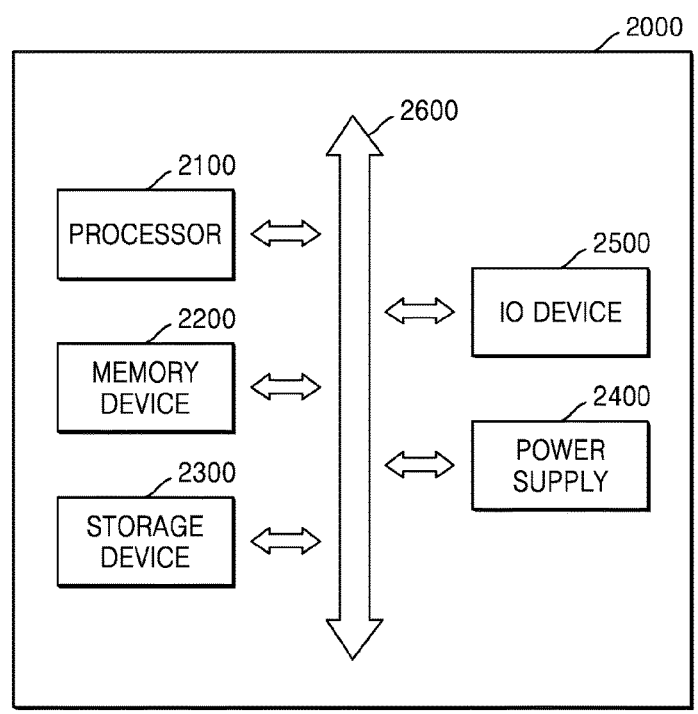
FIG. 17 is a block diagram of a computing system that can have an IC(s) designed and manufactured according to the inventive concept.

FIG. 17 is a block diagram of an example a computing system 2000 that may be configured to execute a method according to the inventive concept.

Referring to FIG. 17, the computing system 2000 may include a processor 2100, a memory device 2200, a storage device 2300, a power supply 2400, and an input/output (IO) device 2500. Although not illustrated in FIG. 17, the computing system 2000 may further include ports that communicate with a video card, a sound card, a memory card, a USB device, etc. or that communicate with other electronic devices.

The processor 2100, the memory device 2200, the storage device 2300, the power supply 2400, and the IO device 2500 of the computing system 2000 may include standard cells according to examples and an integrated circuit including the standard cells. In an example, at least one of a plurality of semiconductor devices of the processor 2100, the memory device 2200, the storage device 2300, the power supply 2400, and the IO device 2500 may be formed according to a layout that is created by performing the color remapping operation by using a shift cell in which the color remapping operation is performed with respect to standard cells for each row.

The processor 2100 may perform specific calculations or tasks. More specifically, the processor 2100 may be configured to execute instructions for performing at least one of methods according to the inventive concept. In an example, the processor 2100 may execute a plurality of instructions for performing an operation of allowing a plurality of patterns, which are formed in a layer of a layout of an integrated circuit, to correspond to a plurality of masks, respectively, that is, the color decomposition operation or the coloring operation. In an example, the processor 2100 may execute a plurality of instructions for performing a placement operation of placing cells for each row. In an example, the processor 2100 may execute a plurality of instructions for determining whether the color violation is generated with respect to the placed cells. In an example, the processor 2100 may execute a plurality of instructions for performing the color remapping operation with respect to the color-violated cell.

For example, operations S110 and S120 of FIG. 1, operations S210, S220, and S230 of FIG. 3, operations S240, S250, and S260 of FIG. 9, operations S310, S320, S330, and S340 of FIG. 11, operations S410, S420, S430, S440, S450, and S460 of FIG. 12, and operations S510, S520, S530, and S540 of FIG. 14 may be performed by the processor 2100.

According to an example, the processor 2100 may be a microprocessor or a central processing unit (CPU). The processor 2100 may communicate with the memory device 2200, the storage device 2300, and the IO device 2500 through a bus 2600 including, but not limited to, an address bus, a control bus, and a data bus. According to an example, the processor 2100 may be also connected to an expansion bus such as a peripheral component interconnect (PCI) bus.

The memory device 2200 may store data for operations of the computing system 2000. For example, the memory device 2200 may be implemented with a dynamic RAM (DRAM), a mobile DRAM, a static RAM (SRAM), a phase change RAM (PRAM), a ferroelectric RAM (FRAM), a resistive RAM (RRAM), and/or a magnetoresistive RAM (MRAM). The storage device 2300 may include a solid state drive (SSD), a hard disk drive (HDD), a CD-ROM, etc.

In an example, the memory device 2200 may store a layout of an integrated circuit, a placement and routing program (e.g., 1100 of FIG. 16), a library (e.g., 1200 of FIG. 16), an analyzing program (e.g., 1300 of FIG. 16), a data structure (e.g., 1400 of FIG. 16), a color decomposition program or design rule, etc. The processor 2100 may execute instructions for performing an integrated circuit designing method according to the inventive concept by using the placement and routing program, the library, the analyzing program, the data structure, the color decomposition program or design rule, etc. that are stored in the memory device 2200. Accordingly, the computing system 2000 may design an integrated circuit, that is, a layout of an integrated circuit, automatically using the processor 2100.

The IO device 2500 may include input devices such as a keyboard, a mouse, a microphone, a touch pad, and a touch screen and output devices such as a printer and a display. The power supply 2400 may supply an operating voltage for operations of the computing system 2000.

An integrated circuit designed or designed and manufactured according to the inventive concept and a semiconductor device comprising such an integrated circuit may be packaged according to any of a variety of different packaging technologies. Examples of such packaging technologies include the following: package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), small outline (SOIC), shrink small outline package (SSOP), thin small outline (TSOP), thin quad flatpack (TQFP), system in package (SIP), multi-chip package (MCP), wafer-level fabricated package (WFP), and wafer-level processed stack package (WSP).

Although the inventive concept has been particularly shown and described with reference to examples thereof, it will be understood that various changes in form and details may be made thereto without departing from the spirit and scope of the following claims.

What is claimed is:

1. A method of manufacturing an integrated circuit (IC), the method comprising:
   generating a layout of the IC; and
   manufacturing the IC conforming to the layout,
   wherein the generating of the layout includes:
   allocating a plurality of colors to a plurality of patterns of a first cell, the first cell being a multi-height cell wherein the patterns of the multi-height cell occupy a plurality of rows, and the patterns of the multi-height cell correspond to IC patterns that are to be formed in one layer of the IC by a multi-patterning technology (MPT);
   generating a plurality of shift cells for the multi-height cell according to instructions executed by a processor, the shift cells comprising a first shift cell including a remapped form of the patterns of the multi-height cell that occupy one of the plurality of rows along with the colors allocated thereto with an original form of the patterns of the multi-height cell that occupy another of the plurality of rows along with the colors allocated thereto being retained in the first shift cell, and a second shift cell including a remapped form of the patterns of the multi-height cell that occupy said another of the plurality of rows along with the colors allocated thereto; and
   storing a cell set including the first cell and the plurality of shift cells in a standard cell library of an electronic memory.

2. The method of claim 1, wherein the generating of layout further includes placing the first cell and a second cell adjacent to each other in a first direction in a cell layout,
   determining whether a color violation occurs between the first cell and the second cell, and
   performing a color remapping operation when the color violation occurs, wherein the color remapping operation comprises replacing one of the cells with a shift cell.

3. The method of claim 2, wherein the second cell is a single height cell having patterns in only one row, and the placing aligns the patterns of the single height cell with the patterns of the multi-height cell occupying one of the plurality of rows,
   the color remapping operation is performed in a direction from the first cell to the second cell, and
   the performing of the color remapping operation comprises:
   replacing the second cell with a shift cell including a remapped form of the patterns of the single height cell.

4. The method of claim 2, wherein the second cell is a single height cell having patterns in only one row, and the placing aligns the patterns of the single height cell with the patterns of the multi-height cell occupying one of the plurality of rows,
   the color remapping operation is performed in a direction from the second cell to the first cell, and
   the performing of the color remapping operation comprises:
   replacing the first cell with the first shift cell including a remapped form of the patterns of the multi-height cell that occupy said one of the plurality of rows.

5. The method of claim 2, wherein the second cell is a multi-height cell having patterns in first and second rows,
   the color remapping operation is performed in a direction from the first cell to the second cell, and
   the performing of the color remapping operation comprises:
   replacing the second cell with a shift cell including a remapped form of the patterns thereof that occupy one of the first and second rows, which correspond to a row in the cell layout where the color violation occurs between the first and second cells.

6. The method of claim 2, wherein the generating of layout further includes naming each of the first cell and the shift cells so as to include a flag indicating colors allocated to the patterns for each row thereof in the cell, and
   wherein the storing of the cell set comprises storing the names of the first cell and the shift cells.

7. The method of claim 6, wherein the naming comprises:
   naming each of the multi-height cell and the shift cells generated for the multi-height cell such that the flag includes N bits,
   wherein N is an integer of 2 or more and equals the number of rows of patterns of the multi-height cell.

8. The method of claim 2, wherein the determining of whether the color violation occurs between the first cell and the second cell comprises:

determining whether a distance between a pattern of the first cell and a pattern of the second cell is greater than or equal to a first spacing, the first spacing being a minimum allowable distance between patterns to which the same color is allocated; and determining that the color violation occurs when the distance is smaller than the first spacing.

9. The method of claim 1, wherein the number of shift cells generated for the multi-height cell is equal to $(2^N-1)$, wherein N is an integer of 2 or more and is equal to the number of rows of patterns of the multi-height cell.

10. The method of claim 1, wherein the colors corresponds to different masks, respectively.

11. A method of manufacturing an integrated circuit (IC), the method comprising:

generating a layout of the IC; and manufacturing the IC conforming to the layout, wherein the generating of the layout includes:

a computer-aided design process of placing a multi-height cell and a single height cell in a cell layout, the cells including patterns that are to be formed in a common layer in the IC wherein the patterns of the multi-height cell occupy first and second rows in the cell layout and the patterns of the single height cell only occupy the first row in the cell layout, and the patterns having different colors allocated to them, the different colors being indicators of processes that are to be used to form corresponding patterns of the IC, respectively; and accessing a program including instructions to determine whether a color violation exists between the multi-height cell and the single height cell, and to perform, when the color violation occurs, a color remapping operation of the cell layout in which the patterns of the multi-height cell or the patterns of the single height cell are revised, wherein the revising of the patterns in the color remapping operation includes accessing a standard cell library of an electronic memory in which is stored a shift cell associated with the single height cell and different shift cells each associated with the multi-height cell, the different shift cells associated with the multi-height cell including a first multi-height shift cell having a revised form of the patterns of the multi-height cell that occupy the first row in the cell layout and an unrevised form of the patterns of the multi-height cell that occupy the second row in the cell out and a second multi-height shift cell having a revised form of the patterns of the multi-height cell that occupy the second row in the cell layout.

12. The method of claim 11, wherein the different colors allocated to the patterns of the multi-height cell and the single height cell correspond to different masks, respectively, and which are to be used in a patterning technique of forming the corresponding patterns of the IC.

13. The method of claim 11, wherein the multi-height cell and the single height cell are placed adjacent to each other in the cell layout, and wherein the determining of whether the color violation occurs between the multi-height cell and the single height cell comprises:

determining whether a distance between a pattern of the multi-height cell and a pattern of the single height cell is greater than or equal to a first spacing, the first spacing being a minimum allowable distance between patterns to which the same color is allocated; and determining that the color violation exists when the distance is smaller than the first spacing.

14. The method of claim 11, wherein the color remapping operation is performed in a direction from the single height cell to the multi-height cell, and wherein the performing of the color remapping operation comprises:

replacing the multi-height cell in the cell layout with a selected one of the different shift cells which includes a revised form of the patterns of the multi-height cell that occupy the first row in the cell layout.

15. The method of claim 11, wherein the color remapping operation is performed in a direction from the multi-height cell to the single height cell, and wherein the performing of the color remapping operation comprises:

replacing the single height cell in the cell layout with the shift cell including the revised form of the patterns of the single height cell.

16. A method of manufacturing a semiconductor device, comprising:

a computer aided design process of designing an integrated circuit (IC), wherein the computer aided design process includes generating a layout of the IC by executing:

a layout operation of laying out cells in a plurality of parallel rows within a footprint, the cells including maps, respectively, of patterns to be formed at the same level as one another in the IC by a multi-patterning process using a plurality of masks, and each of the patterns having allocated thereto a color as a designator of which mask among the plurality of masks is to be used to form the pattern in the multi-patterning process, wherein the cells are selected from a library containing a set of standard cells including at least one single height cell each including a map of patterns confined to one of the rows in the footprint when the single height cell is selected and laid out in the footprint, and at least one multi-height cell each including a map of rows of patterns occupying adjacent rows, respectively, in the footprint when the multi-height cell is selected and laid out in the footprint; and executing a color remapping operation by accessing a program including instructions to examine, along each of adjacent first and second ones of adjacent rows in the footprint, colors of patterns of standard cells selected from the library and laid out in the footprint in the layout operation so as to occupy the first and second ones of adjacent rows in the footprint, instructions to remap only the first row of patterns, along with the colors allocated thereto, of a multi-height cell selected from the library and laid out in the footprint in a case in which a second cell selected from the library is laid out in the footprint in said first one of the adjacent rows, the multi-height cell is laid out in the footprint adjacent to the second cell in a first direction, and a color violation exists between the second cell and the multi-height cell laid out adjacent thereto in the first direction, and instructions to remap only the second row of patterns, along with the colors allocated thereto, of a multi-height cell selected from the library and laid out in the footprint in a case in which a second cell selected from the library is laid out in the footprint in said second one of the adjacent rows, the multi-height cell is laid out in the footprint adjacent to the second cell in the first direction, and a color violation exists between the second cell and the multi-height cell laid out adjacent thereto in the first direction; and a manufacturing process comprising fabricating an integrated circuit conforming to the layout, wherein the manufacturing process includes executing the multi-patterning process using masks having mask patterns based on the colors allocated to the patterns in the layout after the remapping operation has been executed.

17. The method of claim 16, wherein the instructions to remap in either of said cases include instructions to select a shift cell, from among a plurality of shift cells associated with the multi-height cell, from the library and replace the multi-height cell in the layout with the selected shift cell, each of the shift cells having a map of patterns different from one another and from that of the multi-height cell in terms of the colors allocated to the patterns.

18. The method of claim 16, wherein the program of the color remapping operation includes instructions to remap the first row of patterns, along with the colors allocated thereto, of a multi-height cell selected from the library and laid out in the footprint in a case in which a single height cell selected from the library is laid out in the footprint in said first one of the adjacent rows, the multi-height cell is laid out in the footprint adjacent to the single height cell in the first direction, and a color violation exists between the single height cell and the multi-height cell laid out adjacent thereto in the first direction, and instructions to remap the second row of patterns, along with the colors allocated thereto, of a multi-height cell selected from the library and laid out in the footprint in a case in which a single height cell is laid out in the footprint in said second one of the adjacent rows, the multi-height cell is laid out in the footprint adjacent to the single height cell in the first direction, and a color violation exists between the single height cell and the multi-height cell laid out adjacent thereto in the first direction.

19. The method of claim 16, wherein the colors allocated to the patterns are examined, in the color remapping operation, in a direction from the multi-height cell to the single height cell.

20. The method of claim 16, wherein a color violation exists between the second cell and the multi-height cell laid out adjacent thereto when a distance between a pattern of the multi-height cell and a pattern of the second height cell is smaller than a first spacing, the first spacing being a minimum distance allowed by the multi-patterning process between patterns to which the same color is allocated.

* * * * *